(12) United States Patent
Price et al.

(10) Patent No.: US 12,260,522 B2
(45) Date of Patent: Mar. 25, 2025

(54) LOW LIGHT AND THERMAL IMAGE NORMALIZATION FOR ADVANCED FUSION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/375,879

(22) Filed: Oct. 2, 2023

(65) Prior Publication Data
US 2024/0029206 A1    Jan. 25, 2024

Related U.S. Application Data

(62) Division of application No. 17/306,681, filed on May 3, 2021, now Pat. No. 11,810,278.

(51) Int. Cl.
| | |
|---|---|
| *G06T 5/50* | (2006.01) |
| *G06T 3/40* | (2024.01) |
| *G06T 5/70* | (2024.01) |
| *G06T 7/13* | (2017.01) |
| *G06T 7/33* | (2017.01) |
| *G06T 7/40* | (2017.01) |
| *H04N 5/265* | (2006.01) |
| *H04N 23/90* | (2023.01) |

(52) U.S. Cl.
CPC ............... *G06T 5/50* (2013.01); *G06T 3/40* (2013.01); *G06T 5/70* (2024.01); *G06T 7/13* (2017.01); *G06T 7/33* (2017.01); *G06T 7/40* (2013.01); *H04N 5/265* (2013.01); *H04N 23/90* (2023.01); *G06T 2207/10024* (2013.01); *G06T 2207/10048* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2010/0045809 A1* | 2/2010 | Packard | ............... | H04N 23/23 |
| | | | | 348/E5.022 |
| 2014/0324367 A1* | 10/2014 | Garvey, III | ........... | G01D 18/00 |
| | | | | 702/56 |

(Continued)

*Primary Examiner* — Xiaolan Xu
(74) *Attorney, Agent, or Firm* — Workman Nydegger

(57) ABSTRACT

Techniques for generating a fused enhanced image. A first image is generated using a first camera of a first modality, and a second image is generated using a second camera of a second modality. Pixels that are common between the two images are identified. Textures for the common pixels are determined. A camera characteristic, which is linked to noise, is identified. A scaling factor is applied to the textures in the first image. A first saliency is determined using the scaled textures. A second saliency is determined using the textures from the second image. An alpha map is generated and reflects edge detection weights that have been computed for each one of the common pixels based on the two saliencies. Based on the alpha map, textures are merged from the common pixels to generate the fused enhanced image.

20 Claims, 21 Drawing Sheets

(56) References Cited

U.S. PATENT DOCUMENTS

2016/0093034 A1\* 3/2016 Beck .................... G08B 13/181
　　　　　　　　　　　　　　　　　　　　　　345/617
2018/0035058 A1\* 2/2018 Thumpudi ................ G06T 5/73
2021/0160441 A1\* 5/2021 Bleyer .................... G06T 7/593

\* cited by examiner

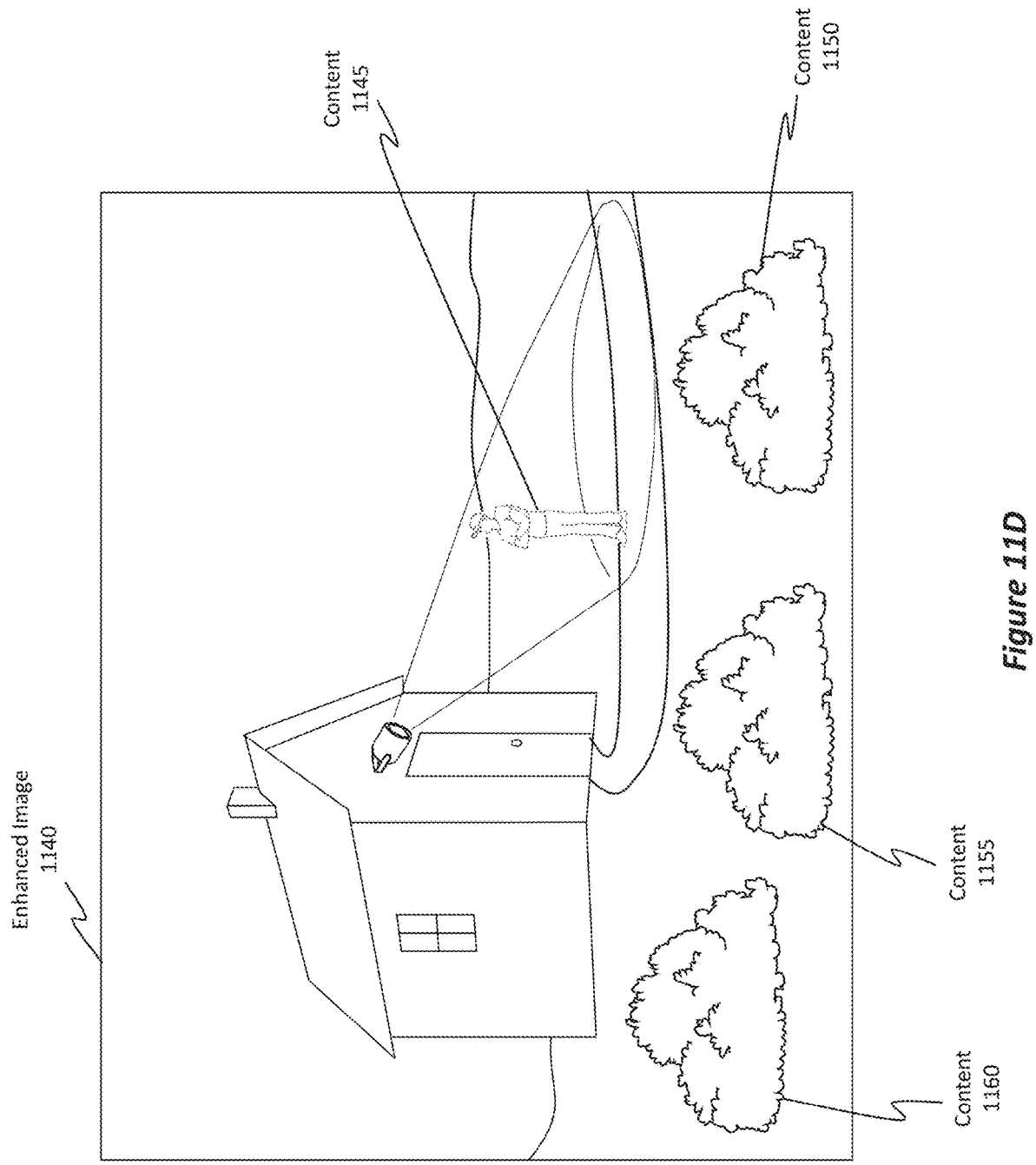

LOW LIGHT AND THERMAL IMAGE NORMALIZATION FOR ADVANCED FUSION

CROSS-REFERENCE TO RELATED APPLICATIONS

This application is a Divisional of U.S. patent application Ser. No. 17/306,681 filed on May 3, 2021, entitled "LOW LIGHT AND THERMAL IMAGE NORMALIZATION FOR ADVANCED FUSION," which application is expressly incorporated herein by reference in its entirety.

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content. Use of the term "HMD" can also refer to a MR system.

A MR system can employ different types of cameras (aka "modalities") in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment provides many advantages. Despite the current benefits provided by passthrough images, there are additional benefits that may be achieved by improving the processes by which passthrough images are generated, especially when multiple different cameras are involved. Accordingly, it is desirable to further improve the benefits provided by passthrough image generation techniques.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, head mounted devices, hardware storage devices, etc.), and methods for mitigating the effects of noise in an image when fusing multiple images together to generate a fused enhanced image.

Some embodiments include a first camera of a first modality (e.g., perhaps a low light modality) and a second camera of a second modality (e.g., perhaps a thermal imaging modality). The embodiments generate a first image of an environment using the first camera and generate a second image of the environment using the second camera. Pixels that are common between the two images are identified. A first set of textures for the common pixels included in the first image are determined, and a second set of textures for the common pixels included in the second image are also determined. The embodiments also determine a camera characteristic (e.g., a gain setting) of the first camera, where that characteristic is linked or associated with noise that may be present in the first image. Based on the camera characteristic, a scaling factor is applied to the first set of textures to generate a scaled set of textures. In effect, applying the scaling factor operates to mitigate noise that is potentially present in the first image. The embodiments use the scaled set of textures to determine a first saliency of the first image, where the term "saliency" refers to or reflects an amount of texture variation that is present in the scaled set of textures. Additionally, the embodiments determine a second saliency of the second image. The embodiments generate an alpha map that reflects edge detection weights that have been computed for each one of the common pixels based on the saliencies. Using the alpha map, the embodiments merge textures from the common pixels included in the first image and the second image to generate a fused enhanced image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 11A, 11B, 11C, and 11D illustrate example scenarios in which an enhanced image is generated.

DETAILED DESCRIPTION

Embodiments disclosed herein relate to systems, devices (e.g., wearable devices, head mounted devices, hardware storage devices, etc.), and methods for mitigating the effects of noise when fusing multiple images together to generate a fused enhanced image.

Some embodiments include at least two cameras of differing modalities (e.g., a low light camera and a thermal imaging camera). A first image is generated using a first camera, and a second image is generated using a second camera. Pixels that are common between the two images are identified. Textures for the common pixels are determined. A camera characteristic (e.g., a gain setting) of the first camera is determined, and, based on that characteristic, a scaling factor is selected and applied to one set of textures. Saliencies of the two images (one of which is scaled) are determined, where the saliencies reflect amounts of texture variation present in those images. An alpha map is generated and is configured to reflect edge detection weights that have been computed for each one of the common pixels based on the two saliencies. Based on the alpha map, the embodiments merge textures from the common pixels to generate the enhanced image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the technical field. By way of example, the embodiments are able to produce or generate a so-called "enhanced" image. Different camera modalities are designed to provide different types of benefits. By following the disclosed principles, the embodiments are able to generate an enhanced image, which enables the benefits that are available to each individual modality to now be made available via a single image as opposed to multiple images. In doing so, improved analytics, computer vision, and user interaction with the computer system are achieved. Furthermore, the user (in some instances) is provided with content that he/she would potentially not be able to view or interact with if only a single image type or modality were used.

Additionally, the disclosed embodiments are able to mitigate the effects of noise that may be present in an image. When images are fused together, it is possible that noise in one image can detrimentally impact the resulting fused image. By following the disclosed principles, the embodiments are able to beneficially eliminate or at least reduce the impact noise might have on the resulting fused enhanced image. Accordingly, these and other benefits will be described in more detail throughout the remaining portion of this disclosure.

Example HMDs & Scanning Systems

Figure 1:
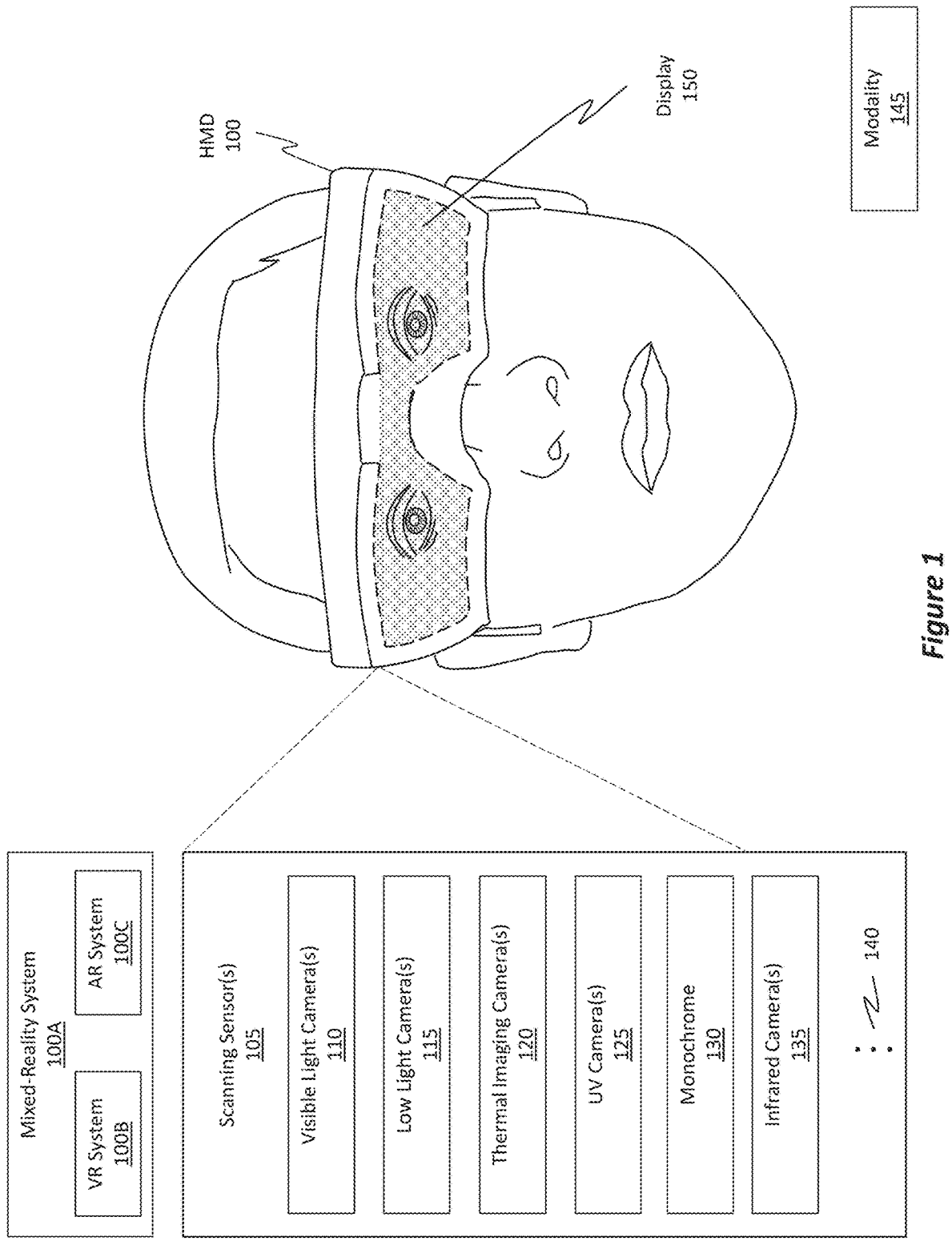
FIG. 1 illustrates an example head mounted device (HMD).

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD to scan an environment to provide a passthrough visualization (aka passthrough image), the embodiments are not limited to being practiced using only an HMD. That is, any type of scanning system can be used, even systems entirely removed or separate from an HMD. For example, a self-driving car can implement the disclosed operations.

Consequently, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualization of the user's environment. A "passthrough" visualization refers to a visualization that reflects what the user would see if the user were not wearing the HMD 100, regardless of whether the HMD 100 is included as a part of an AR system or a VR system, though that passthrough image may be supplemented with additional or enhanced content. To generate this passthrough visualization, the HMD 100 may use its scanning sensor(s) 105 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 105 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then passthrough images can be generated (e.g., one for each pupil), and a depth map can also be computed from the depth data embedded or included within the raw images.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 100. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, ultraviolet (UV) cameras 125, monochrome 130 cameras, and infrared camera(s) 135. The ellipsis 140 demonstrates how any other type of camera or camera system (e.g., depth cameras, time of flight cameras, etc.) may be included among the scanning sensor(s) 105. In this regard, cameras of different modalities (as reflected by modality 145) are included on the HMD 100. The scanning sensor(s) 105 generate images, which may be used to generate passthrough images, which may then be displayed on a display 150 of the HMD 100.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 110 micro-lux and about 10 lux.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. These wavelengths are also included in the light spectrum(s). Because the thermal imaging camera(s) 120 detect far-IR radiation, the thermal imaging camera(s) 120 can operate in any illuminance condition, without restriction.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera modalities. The different camera modalities include, but are not limited to, visible light or monochrome cameras, low light cameras, thermal imaging cameras, and UV cameras.

It should be noted that any number of cameras may be provided on the HMD 100 for each of the different camera types/modalities. That is, the visible light camera(s) 110 may include 1, 2, 3, 4, 5, 6, 7, 8, 9, 10, or more than 10 cameras. Often, however, the number of cameras is at least 2 so the HMD 100 can perform stereoscopic depth matching. Similarly, the low light camera(s) 115, the thermal imaging camera(s) 120, the UV camera(s) 125, the monochrome 130 cameras, and the infrared camera(s) 135 may each respectively include 1, 2, 3, 4, 5, 6, 7, 8, 9, 10, or more than 10 corresponding cameras.

Figure 2:
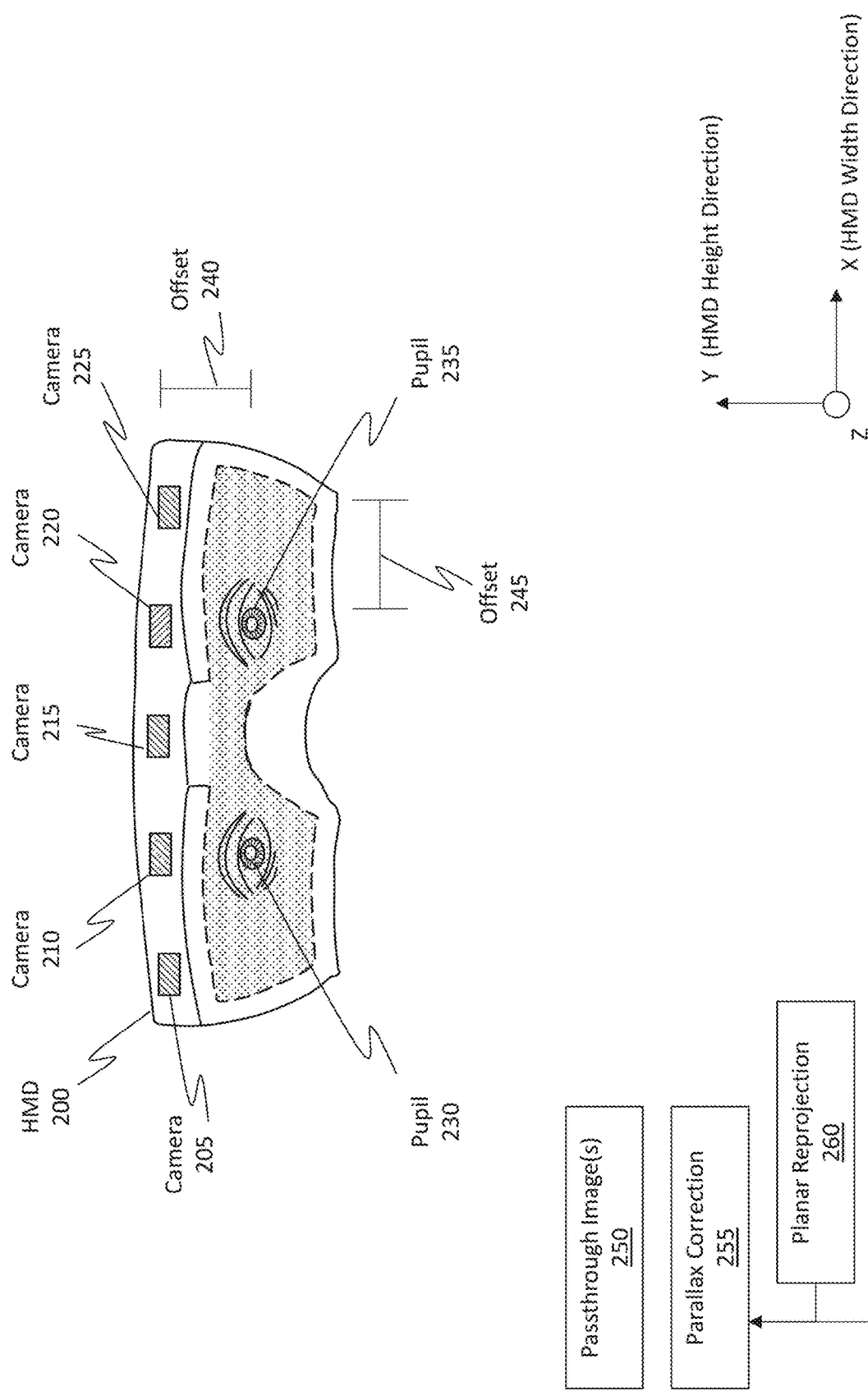
FIG. 2 illustrates how an HMD can include various different cameras.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, the UV camera(s) 125, the monochrome 130 cameras, and the infrared camera(s) 135 from FIG. 1. While only 5 cameras are illustrated in FIG. 2, HMD 200 may include more or less than 5 cameras.

In some cases, the cameras can be located at specific positions on the HMD 200. For instance, in some cases a first camera (e.g., perhaps camera 220) is disposed on the HMD 200 at a position above a designated left eye position of any users who wear the HMD 200 relative to a height direction of the HMD. For instance, the camera 220 is positioned above the pupil 235. As another example, the first camera (e.g., camera 220) is additionally positioned above the designated left eye position relative to a width direction of the HMD. That is, the camera 220 is positioned not only above the pupil 235 but also in-line relative to the pupil 235. When a VR system is used, a camera may be placed directly in front of the designated left eye position. For example, with reference to FIG. 2, a camera may be physically disposed on the HMD 200 at a position in front of the pupil 235 in the z-axis direction.

When a second camera is provided (e.g., perhaps camera 210), the second camera may be disposed on the HMD at a position above a designated right eye position of any users who wear the HMD relative to the height direction of the HMD. For instance, the camera 210 is above the pupil 230. In some cases, the second camera is additionally positioned above the designated right eye position relative to the width direction of the HMD. In some cases, the first camera is a low light camera, and the HMD includes one or more low light cameras. In some cases, the second camera is a thermal imaging camera, and HMD includes one or more thermal imaging cameras. The HMD may additionally include multiple visible light RGB cameras or monochrome cameras. When a VR system is used, a camera may be placed directly in front of the designated right eye position. For example, with reference to FIG. 2, a camera may be physically disposed on the HMD 200 at a position in front of the pupil 230 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

As described earlier, HMD 200 is configured to provide passthrough image(s) 250 for the user of HMD 200 to view. In doing so, HMD 200 is able to provide a visualization of the real world without requiring the user to remove or reposition HMD 200. Sometimes, the visualization is enhanced, modified, or supplemented with additional information, as will be described in more detail later. The passthrough image(s) 250 effectively represent the same view the user would see if the user were not wearing HMD 200. Cameras 205-225 are used to provide these passthrough image(s) 250.

None of the cameras 205-225, however, are directly aligned with the pupils 230 and 235. The offsets 240 and 245 actually introduce differences in perspective as between the cameras 205-225 and the pupils 230 and 235. These perspective differences are referred to as "parallax."

Because of the parallax occurring as a result of the offsets 240 and 245, raw images produced by the cameras 205-225 are not available for immediate use as passthrough image(s) 250. Instead, it is beneficial to perform a parallax correction 255 (aka an image synthesis) on the raw images to transform the perspectives embodied within those raw images to correspond to perspectives of the user's pupils 230 and 235. The parallax correction 255 includes any number of distortion corrections (e.g., to correct for concave or convex wide or narrow angled camera lenses), epipolar transforms (e.g., to parallelize the optical axes of the cameras), and/or reprojection transforms (e.g., to reposition the optical axes so as to be essentially in front of or in-line with the user's pupils). The parallax correction 255 may include performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

In some cases, the parallax correction 255 includes a planar reprojection 260 where all pixels of an image are reprojected to a common planar depth. In some cases, the parallax correction 255 includes a full reprojection 265 where various pixels are reprojected to different depths.

By performing these different transforms or reprojections, the embodiments are optionally able to perform three-dimensional (3D) geometric transforms on the raw camera images to transform the perspectives of the raw images in a manner so as to correlate with the perspectives of the user's pupils 230 and 235. Additionally, the 3D geometric transforms rely on depth computations in which the objects in the HMD 200's environment are mapped out to determine their depths. Based on these depth computations, the embodiments are able to three-dimensionally reproject or three-dimensionally warp the raw images in such a way so as to preserve the appearance of object depth in the passthrough image(s) 250, where the preserved object depth substantially matches, corresponds, or visualizes the actual depth of objects in the real world. Accordingly, the degree or amount of the parallax correction 255 is at least partially dependent on the degree or amount of the offsets 240 and 245.

By performing the parallax correction 255, the embodiments effectively create "virtual" cameras having positions that are in front of the user's pupils 230 and 235. By way of additional clarification, consider the position of camera 205, which is currently above and to the left of the pupil 230. By performing the parallax correction 255, the embodiments programmatically transform images generated by camera 205, or rather the perspectives of those images, so the perspectives appear as though camera 205 were actually positioned immediately in front of pupil 230. That is, even though camera 205 does not actually move, the embodiments are able to transform images generated by camera 205 so those images have the appearance as if camera 205 were positioned in front of pupil 230.

Generating Images

Figure 3:
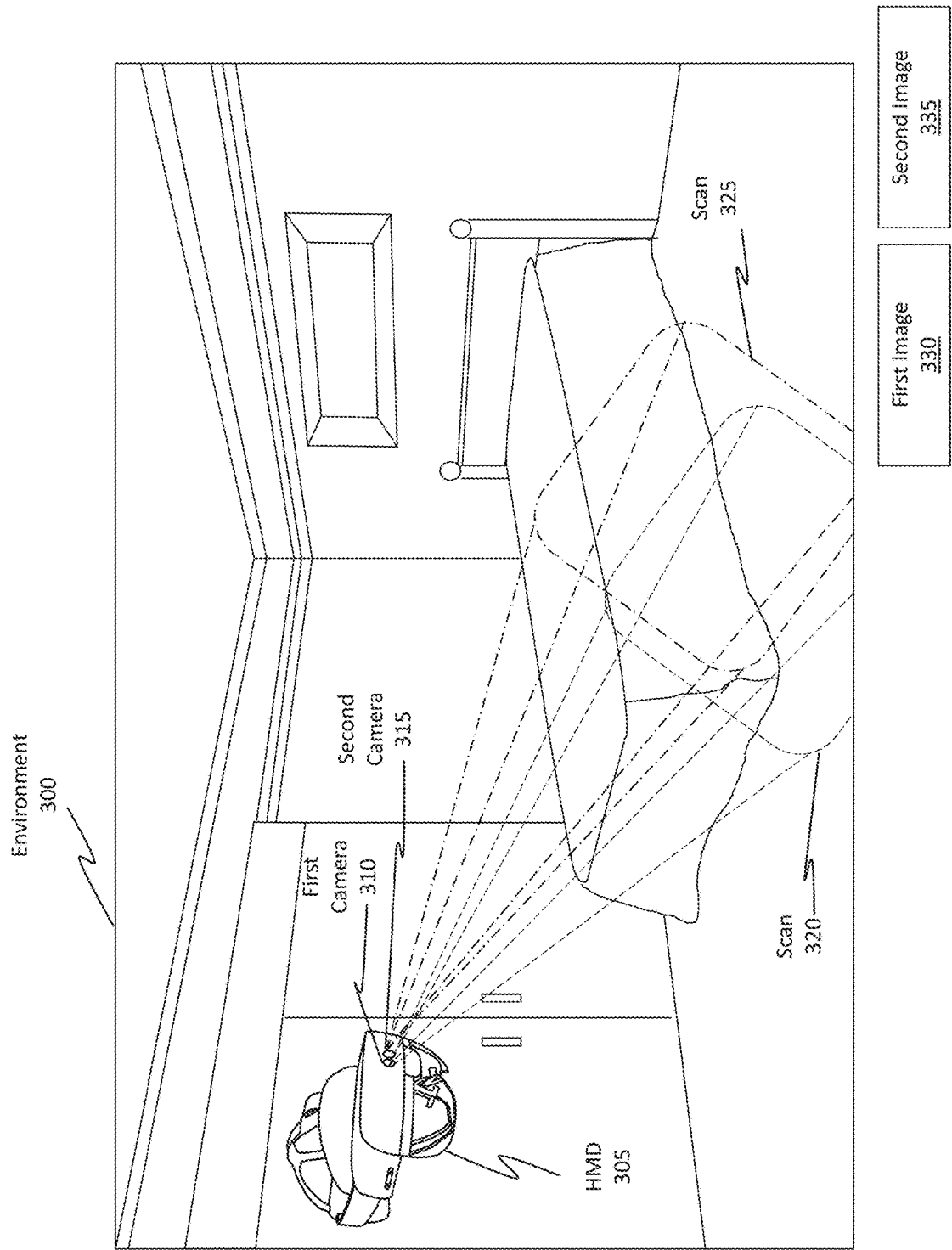
FIG. 3 illustrates how an HMD may be used to scan an environment to generate different images.

Attention will now be directed to FIG. 3, which illustrates an environment 300 in which an HMD 305 is operating. Notice, the HMD 305 includes at least a first camera 310 and a second camera 315. It is often the case that the modality of the first camera 310 is different than the modality of the second camera 315. For example, the first camera 310 may have a low light image modality while the second camera 315 may have a thermal imaging modality. Of course, other modalities (such as the ones discussed previously) may also be used.

FIG. 3 shows how the first camera 310 is scanning the environment 300, as shown by scan 320. Likewise, the second camera 315 is also scanning the environment 300, as shown by scan 325. As a result of performing the scans, the first camera 310 generates a first image 330, and the second camera 315 generates a second image 335. Of course, any number of images may be generated.

Figure 4:
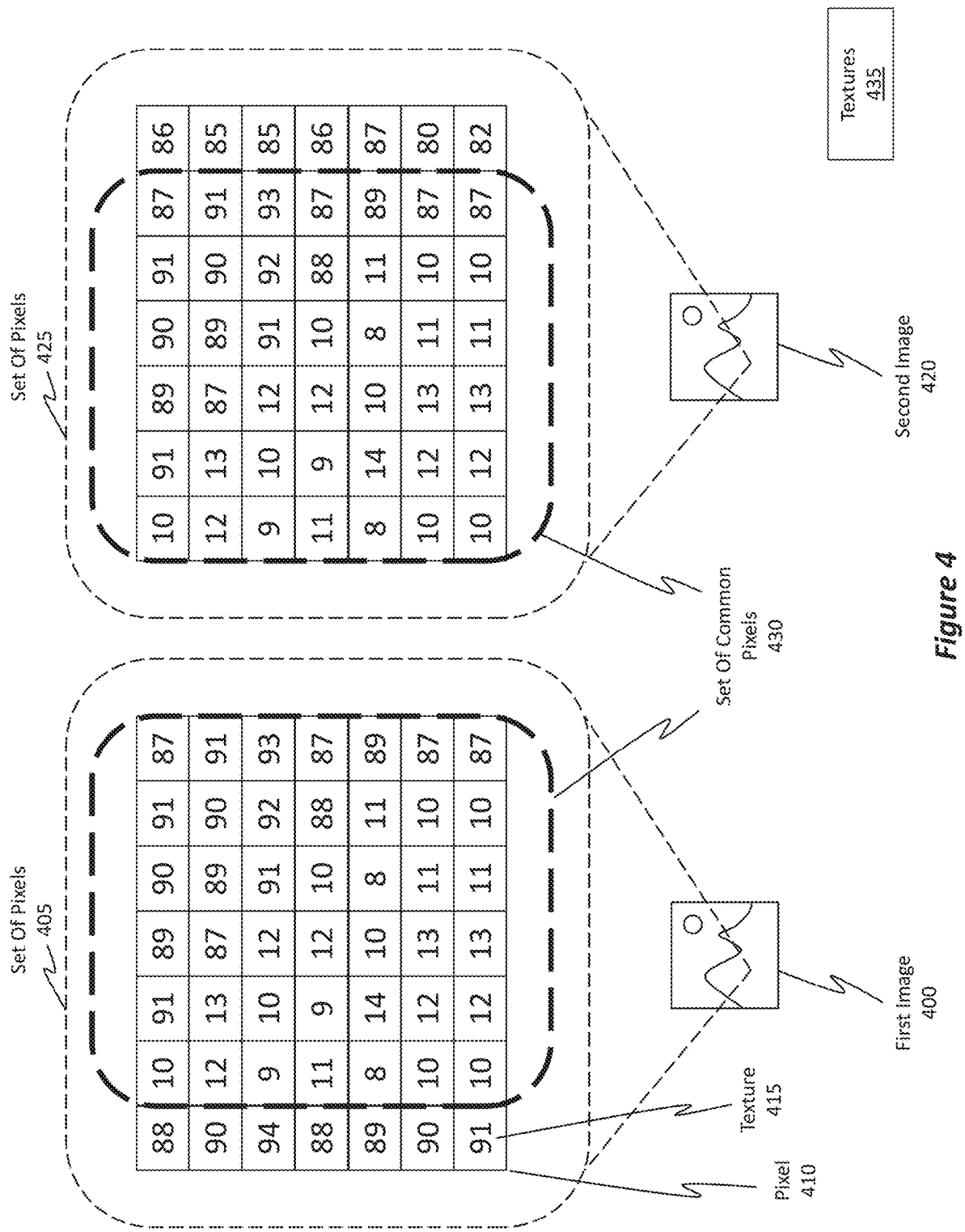
FIG. 4 illustrates how different images can include common content and how each pixel in the image can be assigned a texture value.

FIG. 4 shows a first image 400, which is representative of the first image 330 from FIG. 3. The first image 400 is comprised of a set of pixels 405, such as pixel 410. A texture (aka "intensity") may be determined for each pixel or for at least a group of pixels. For example, the pixel 410 is shown as having a texture 415 (e.g., the texture value "91").

As used herein, the term "texture" generally refers to a metric or a set of values that quantify the spatial arrangement of intensity and/or color of a pixel in an image. Stated differently, texture characterizes the spatial distribution of a pixel's intensity level relative to that pixel's neighboring pixels. Texture is also used to divide or partition an image into different so-called "regions of interest" so those regions can then be segmented or classified. Additionally, texture reflects or quantifies other characteristics, such as smoothness, coarseness, and regularity.

FIG. 4 shows a second image 420, which is representative of the second image 335 of FIG. 3. Notice, the second image 420 is also comprised of a set of pixels 425.

Due to the placement of the cameras on the computer system (e.g., the HMD 305 of FIG. 3) the fields of view (FOV) of the different cameras at least partially overlap with one another. Consequently, the resulting images from the first and second cameras include corresponding or similar content. The set of common pixels 430 illustrates this concept. That is, the set of common pixels 430 are pixels representing the same environmental content, which has been captured by both the first image 400 and the second image 420. Accordingly, the various images include pixels and textures 435.

It should be noted that the texture values for the common pixels between the two images may vary even though they reflect the same area of the environment. By way of example, suppose a thermal imaging camera was directed toward a spotlight and further suppose a low light camera was also directed toward that same spotlight. Here, the two resulting images would capture the same area of the environment, but the pixel intensities will likely be different. That is, the illumination provided by the spotlight might possibly saturate the low light camera sensors while that same illumination might have no effect on the sensors of the thermal imaging camera. Further details on this aspect will be provided later. In any event, the embodiments are able to determine which pixels of which images reflect similar or corresponding content, even if the texture or intensity values for those pixels are different between the two images.

Figure 5:
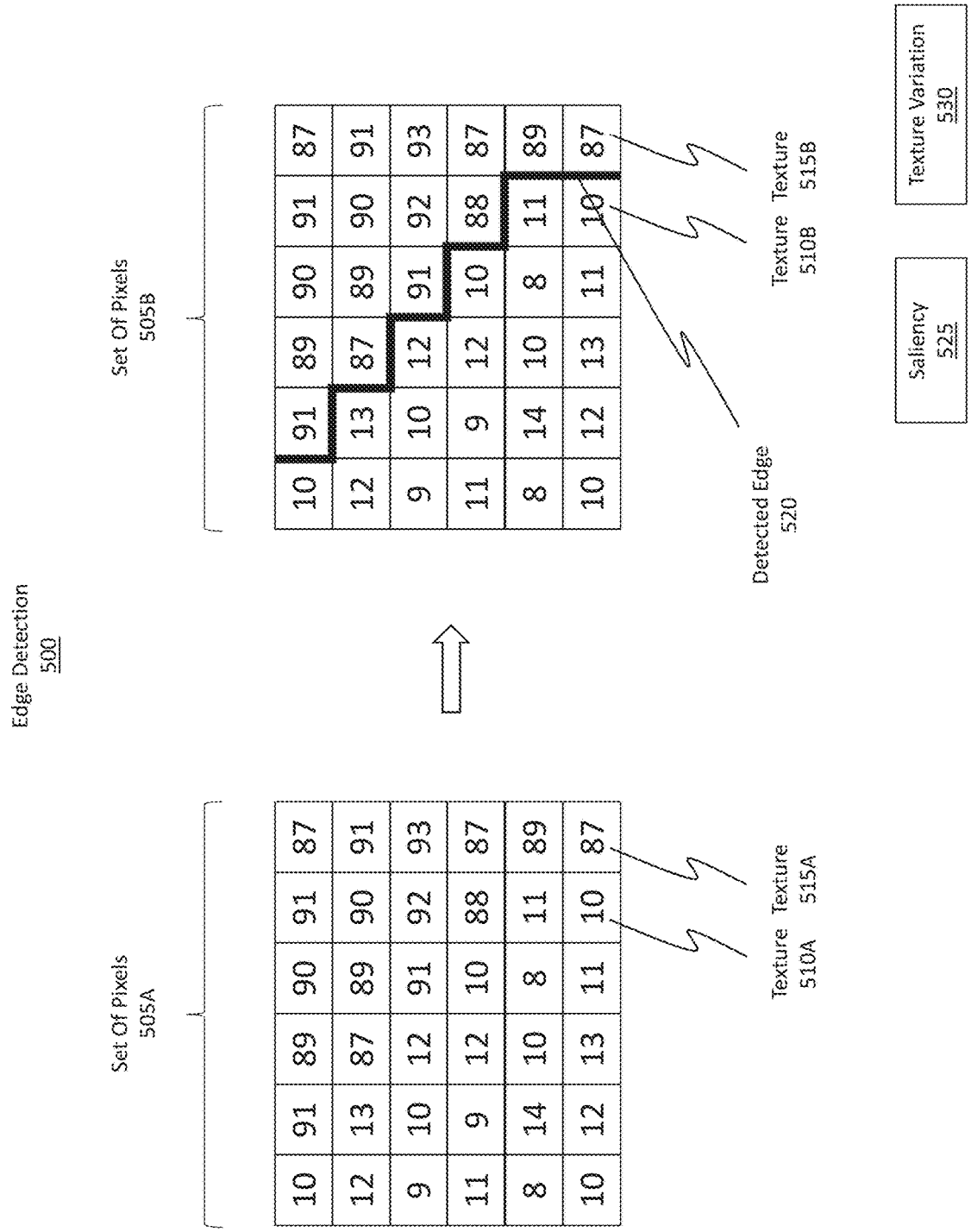
FIG. 5 illustrates how variations in texture can be used to determine a saliency of an image, where the saliency reflects detected edges.

In accordance with the disclosed principles, the embodiments are able to perform edge detection 500, as shown in FIG. 5, on each one of the different images. To clarify, edge detection may be performed on the first image 400 and also on the second image 420 shown in FIG. 4. In some cases, the edge detection operations may be limited or restrained to only those pixels that are common between the two images (e.g., the set of common pixels 430).

FIG. 5 shows a set of pixels 505A, which are representative of the set of common pixels 430 from FIG. 4. Notice, the set of pixels 505A also shows the textures for the various pixels, such as texture 510A and 515A.

The embodiments are able to use the various pixels to perform the edge detection 500. For example, in the set of pixels 505B, which are representative of the set of pixels 505A, notice the stark contrast between the texture 510B and the texture 515B. That is, the texture value for the texture 510B is "10" while the texture value for the texture 515B is "87." The variance or difference between these texture values surpasses a threshold value, thereby causing the embodiments to identify or determine an "edge" exists between the respective pixels. The boldened line between the two pixels reflects this detected edge, as shown by detected edge 520.

As used herein, the term "edge" generally refers to a significant local change that exists in an image, such as a change in the image's intensity at a particular location. An edge can also be thought of as a discontinuity change in the image's intensity at that particular location. The process of detecting edges, or "edge detection," is the technique for identifying points or locations within an image where the image's intensity or brightness changes dramatically and produces the discontinuity.

The term "saliency" (such as saliency 525) reflects an amount of texture variation 530 that exists between groups of pixels. In this case, the texture variation 530 between texture 510B and 515B is the value "77," which (in this example case) surpasses a predetermined threshold value for determining whether an edge exists between pixels. If the saliency for a group of pixels meets or exceeds the threshold value, then an edge exists.

The embodiments are able to analyze the textures for the various pixels in the images to determine the texture variations between the pixels. The texture variations are then used to determine the saliency of the image and to detect the presence or absence of edges between pixels.

Figure 6:
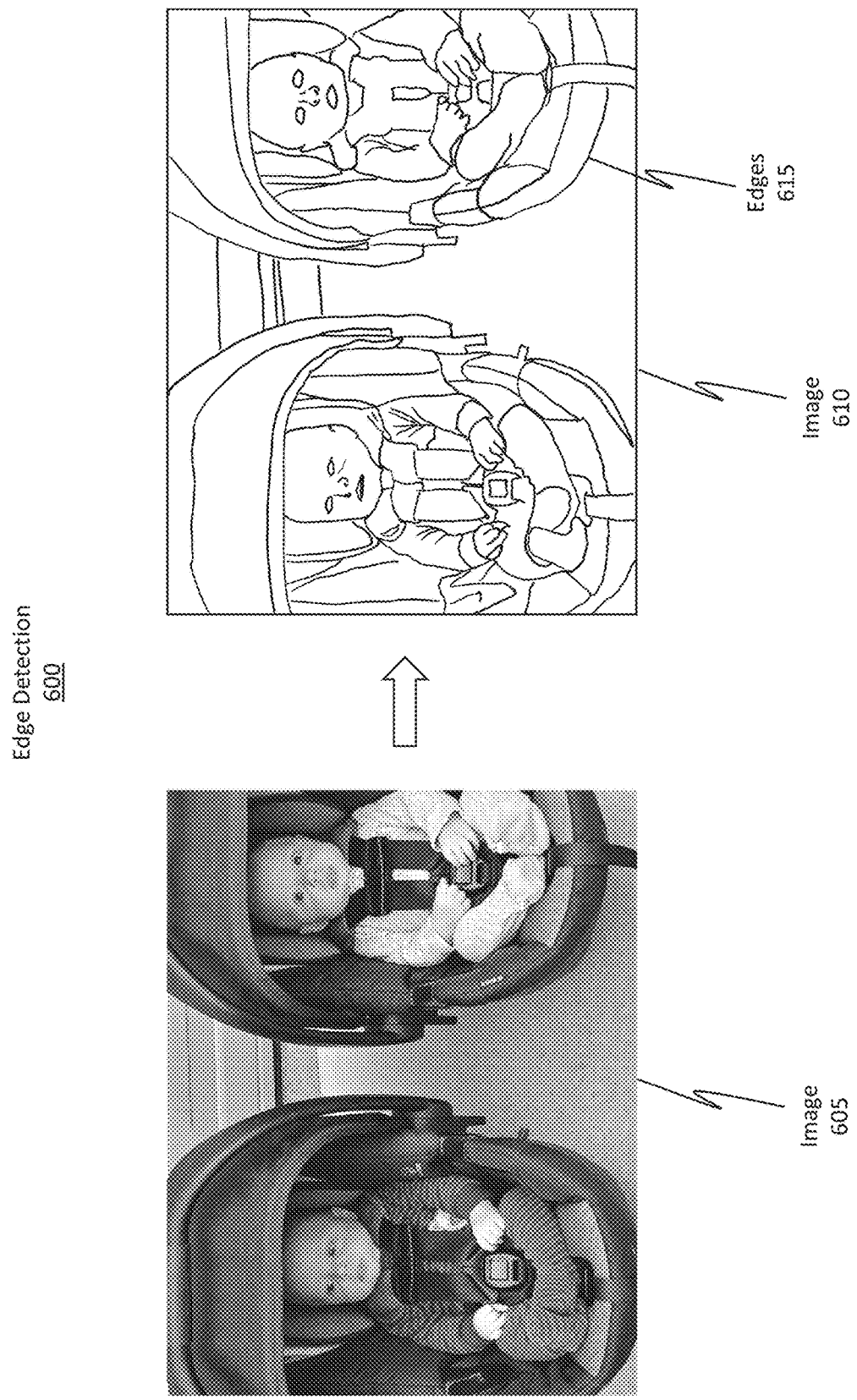
FIG. 6 illustrates the results of performing edge detection on an image.

Turning briefly to FIG. 6, this figure shows an edge detection 600 process performed on an image 605. The result of the edge detection 600 is the image 610, which illustrates the various detected edges 615. These edges 615 were detected based on the saliency and texture variations that were identified by analyzing the image 605.

Edge detection may be performed in a number of ways. One example technique is illustrated in FIG. 7.

Figure 7:
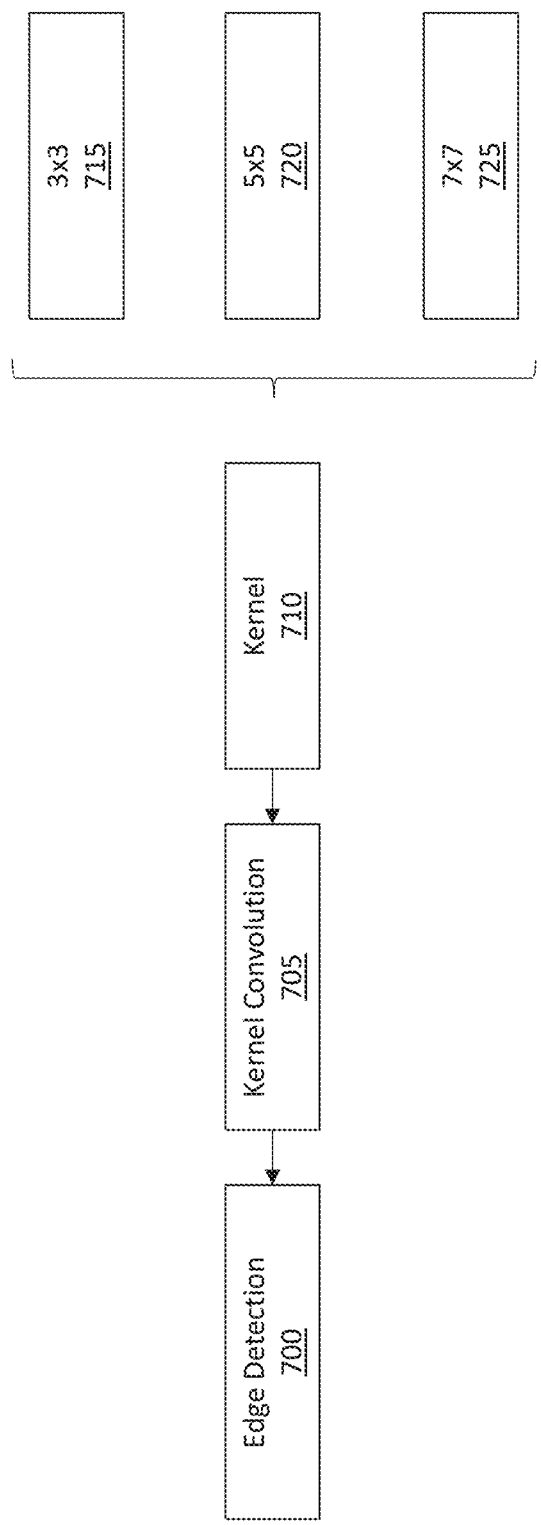
FIG. 7 illustrates different techniques for performing edge detection.

FIG. 7 shows an edge detection 700 technique that is based on kernel convolution 705. Kernel convolution 705 involves the use of a kernel 710, which is a defined grouping of pixels or which can also be referred to as a small matrix. In some cases, the grouping of pixels may be a "3×3" 715 group of pixels, a "5×5" 720 group of pixels, or a "7×7" 725 group of pixels. Stated differently, various edge detection weights or responses (aka alpha intensities) may be computed by kernel convolution 705, where a kernel 710 of pixels used by the kernel convolution 705 is comprised of a group of pixels.

In image processing, kernel convolution 705 is generally used for edge detection, sharpening, blurring, or even embossing. The technique is performing by executing a convolution between a kernel and an image. Briefly, a convolution is a technique for adding a particular element of an image to its adjacent neighbors, weighted by the kernel. Accordingly, edges in an image may be detected by performing kernel convolution 705.

Figure 8:
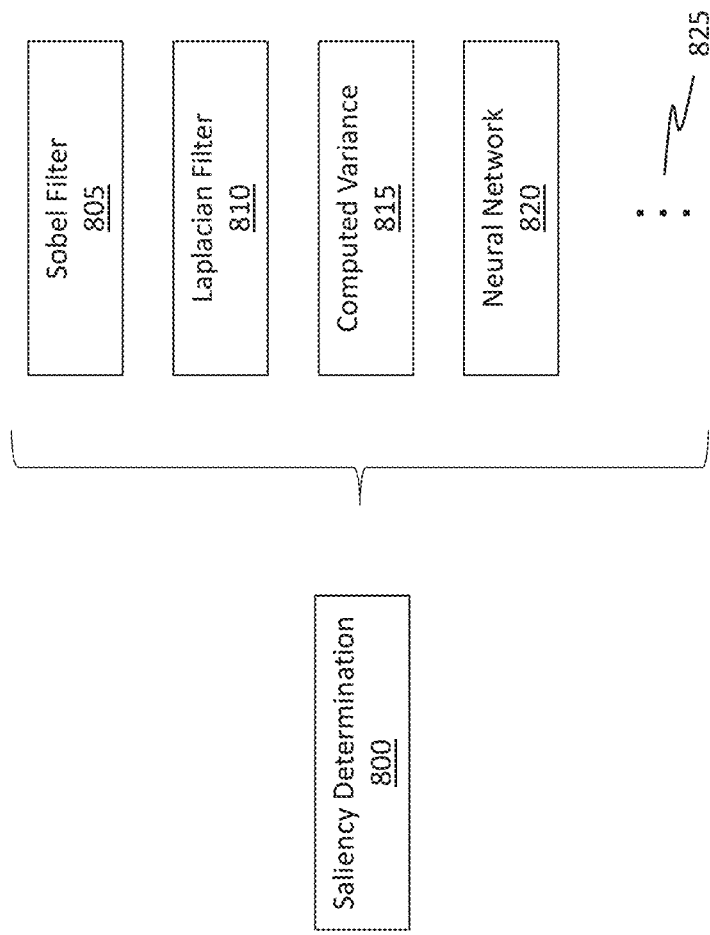
FIG. 8 illustrates different techniques for determining saliency.

Saliency can also be performed using a variety of techniques, as illustrated in FIG. 8 via the saliency determination 800. As shown, the saliency determination 800 includes, but is not limited to, use of a Sobel filter 805 to determine saliency. A Sobel filter 805 is used in image processing to create an image focused on edges. Generally, the Sobel filter 805 is a type of discrete differentiation operator (e.g., a single derivative filter) that computes the approximation of an image intensity's gradient.

Optionally, the saliency determination 800 may be based on the use of a Laplacian filter 810. The Laplacian filter 810 is a type of derivative filter designed to extract both the vertical and horizontal edges from an image, thereby causing the Laplacian filter 810 to be distinct from the Sobel filter 805 (i.e. a type of single derivative filter).

Optionally, saliency can be computed based on a computed variance of intensity values for pixels included within a batch of pixels, as shown by computed variance 815. Optionally, saliency can be determined using a neural network 820 or any type of machine learning. Any type of ML algorithm, model, machine learning, or neural network may be used to identify edges. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The ellipsis 825 demonstrates how other techniques may also be used to determine saliency. Accordingly, various different techniques may be used to detects edges and saliencies.

Generating an Enhanced Image

Figure 9:
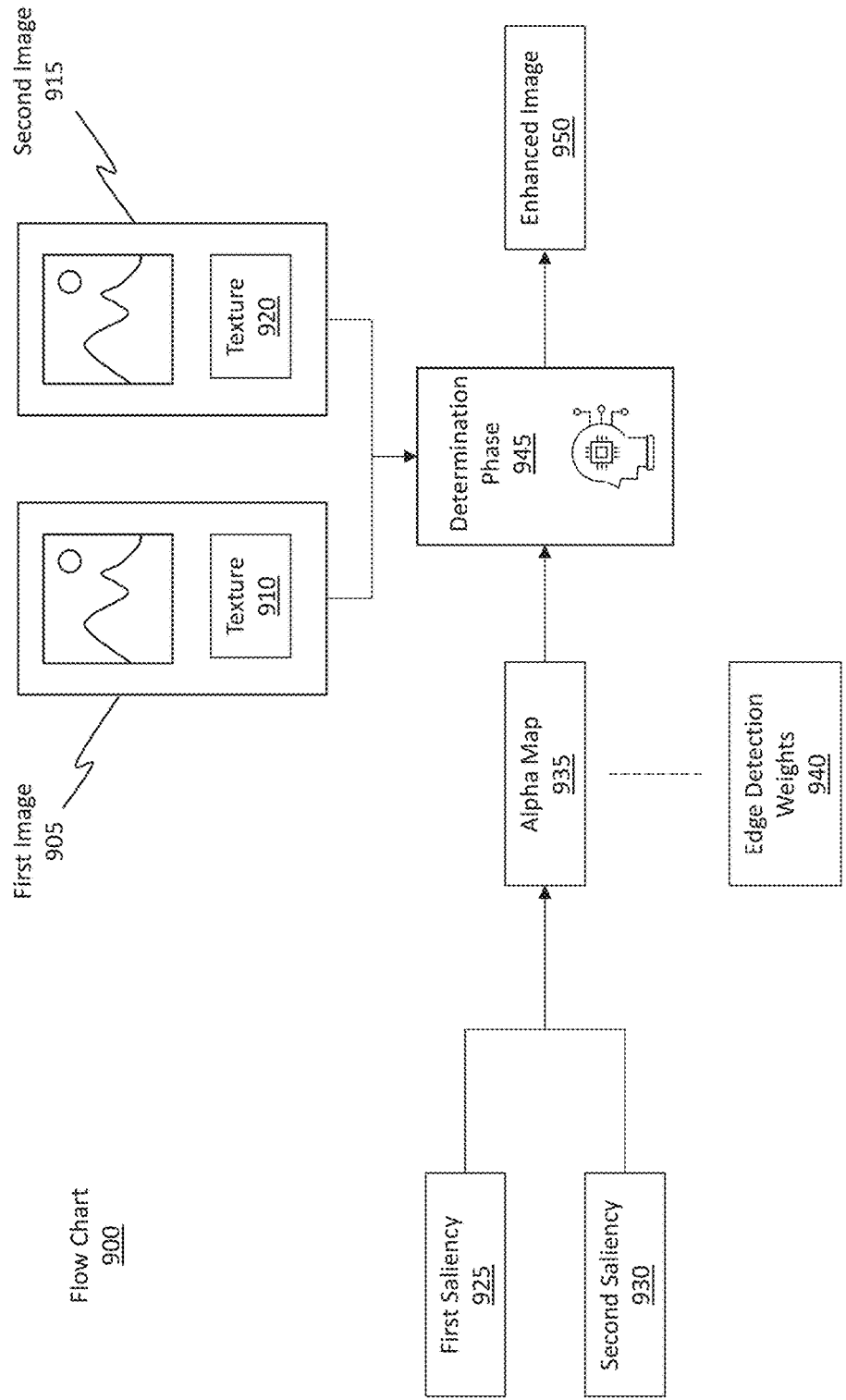
FIG. 9 illustrates a generalized flow process for generating an enhanced image using saliency measures, alpha maps, and edge detection weights.

Attention will now be directed to FIG. 9, which illustrates a flow chart 900 of an example process involving the use of images, textures, saliencies, and an alpha map to generate an enhanced image. Initially, FIG. 9 shows a first image 905, which corresponding texture 910, and a second image 915, which corresponding texture 920. Using the principles discussed earlier, the embodiments are able to determine a first saliency 925 for the first image 905 and a second saliency 930 for the second image 915.

An alpha map 935 is then generated based on the first saliency 925 and the second saliency 930. The alpha map 935 reflects edge detection weights 940 that have been computed for each of the common pixels that are common between the first image 905 and the second image 915, and the computation is based on the first saliency 925 and the second saliency 930.

Figure 10:
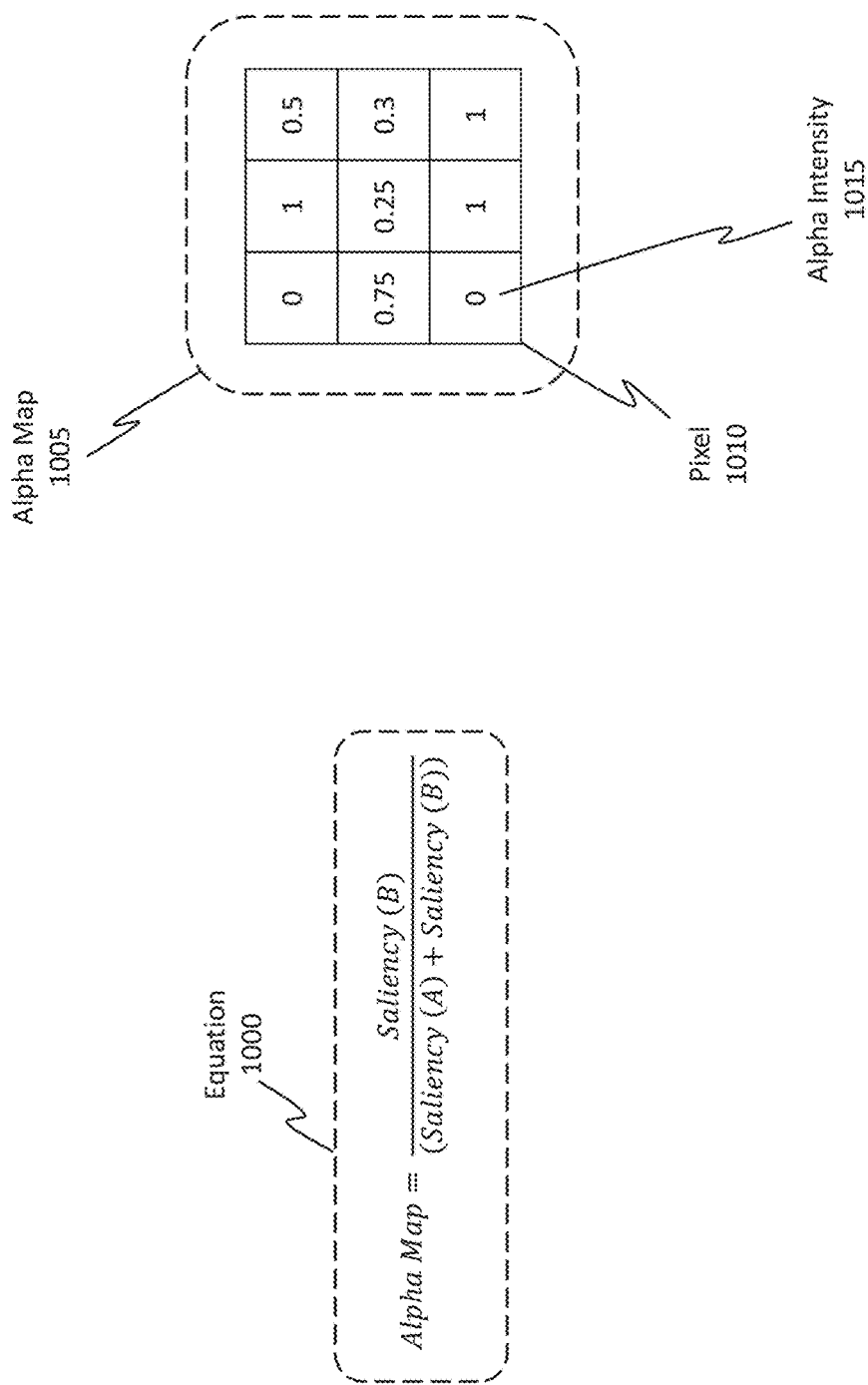
FIG. 10 illustrates an example equation that may be used to generate an alpha map.

Turning briefly to FIG. 10, this figure shows an equation 1000 used to generate an alpha map 1005, which is representative of the alpha map 935 from FIG. 9. Specifically, the equation 1000 is as follows:

Alpha Map=(Saliency($B$))/((Saliency($A$)+Saliency($B$)))

Where "Saliency(B)" is the saliency of a thermal image, or rather, the second saliency 925 (i.e. the saliency of the second image 905) and where "Saliency(A)" is the saliency of a low light image, or rather, the first saliency 930 (i.e. the saliency of the first image 915).

The alpha map 1005 is then shown as comprising a number of pixels, such as pixel 1010. Each pixel is assigned its own corresponding alpha intensity 1015 (i.e. an "edge detection weight" such as the edge detection weights 940 in FIG. 9), which is a number between 0 and 1 and which is a number that is generated using the equation 1000. An alpha intensity value of 0 indicates an alpha intensity originating only from the second image (e.g., the thermal image), and a value of 1 indicates an alpha intensity originating only from the first image (e.g., the low light image). An alpha intensity value of 0.5 indicates an alpha intensity originating from both the first (e.g., the low light image) and second image (e.g., the thermal image) in equal parts.

The alpha intensities, or rather the edge detection weights 940 in FIG. 9, are used to determine how much texture from each respective image will be used to when generating an enhanced image. By way of example, an alpha intensity of 1 (or edge detection weight of 1) indicates that texture originating only from the first image (e.g., the low light image) will be used and no texture from the second image (e.g., the thermal image) will be used. Relatedly, an alpha intensity of 0 indicates that texture originating only from the second image (e.g., the thermal image) will be used and no texture from the first image (e.g., the low light image) will be used. An alpha intensity of 0.5 means textures from both images will be used equally.

In more detail, let "I" be the image of the second modality (e.g., modality 2) and "J" be the image of the first modality (e.g., modality 1). Image "I" is divided into both a low frequency component (e.g., "I_l") and a high frequency component and ("I_h"). The low frequency component ("I_l") is derived by applying a box filter on "I."

The high frequency component ("I_h") is computed by subtracting "I_l" from the original image "I." In other words, "I_h"="I"−"I_l."

In the same manner, the image J is decomposed into low and high frequency components (e.g., "J_l" and "J_h", respectively). Two alpha maps are then computed (e.g., "alpha_l" for the low frequency images and "alpha_h" for the high frequency images).

The final fused image "F" (aka an enhanced image) is obtained via the following equation:

$$F=(1-\text{alpha}\_l)*I\_l+\text{alpha}\_l*J\_l+(1-\text{alpha}\_h)*I\_h+\text{alpha}\_h*J\_h.$$

Computing alpha_l and alpha_r is performed by computing image saliency. For computing the low frequency saliency maps, the embodiments ignore image details and focus on the dominant image edges. The saliency map S_I_l is computed for the low frequency component of image I by running the following steps:

As a first step, the embodiments scale down the original image I twice. In other words, the image is scaled from (as one example) a 640×480 resolution to a 420×240 resolution and then to a 210×120 resolution.

As a second step, the embodiments apply a Sobel filter on the scaled image. As a third step, the embodiments apply a Gaussian filter on the Sobel image. S_I_l is obtained by upscaling the filtered image twice. For example, the image is upscaled from a 210×120 resolution to a 420×240 resolution to a 640×480 resolution.

The saliency map S_J_l for the low frequency component of image J is computed as above with the only difference being that image J is used as an input to the saliency computation. The alpha map (e.g., alpha map 935 from FIG. 9) is then computed as follows (thereby reflecting equation 1000 from FIG. 10):

$$\text{alpha}\_l = S\_J\_l / (S\_I\_l + S\_J\_l).$$

For computing the high frequency saliency maps, the embodiments do focus on image details. The saliency maps S_I_h and S_J_h for the high frequency components of images I and J are computed running the same procedure as above without applying image scaling. In other words, only steps 2 and 3 are run. Finally, the high frequency alpha map (e.g., alpha map 935 from FIG. 9) is computed by following the equation listed below (thereby reflecting equation 1000 from FIG. 10):

$$\text{alpha}\_h = S\_J\_h / (S\_I\_h + S\_J\_h).$$

In this regard, the alpha map 935 from FIG. 9 may comprise multiple alpha maps. Such alpha maps may include an alpha map for a high frequency computation and an alpha map for a low frequency computation. The equation for calculating the final fused image "F" may then rely on these various alpha maps to determine the amount of texture to use from each image.

Returning to FIG. 9, the flow chart 900 then illustrates a determination phase 945 where the embodiments determine how much texture from the first image 905 (e.g., the low light image) and/or the second image 915 (e.g., the thermal image) to use to generate an enhanced image 950. Such determinations are based on the edge detection weights 940 (i.e. the alpha intensities) included in the alpha map 935. FIGS. 11A, 11B, 11C, and 11D provide additional clarification relative to the disclosure presented in FIGS. 9 and 10.

In some implementations, the first image 905 (e.g., the low light image) and the second image 915 (e.g., the thermal image) are aligned so that their corresponding perspectives match or coincide with one another. This alignment process may be performed by the parallax correction processes mentioned earlier. In some cases, alignment may also be performed by matching feature points that are presented between the two images. A "feature point" is considered a point of interest that provides a clear contrast, such as a corner or an edge. The embodiments are able to align images by identifying and then matching common feature points that are present in both the images.

Figure 11A:
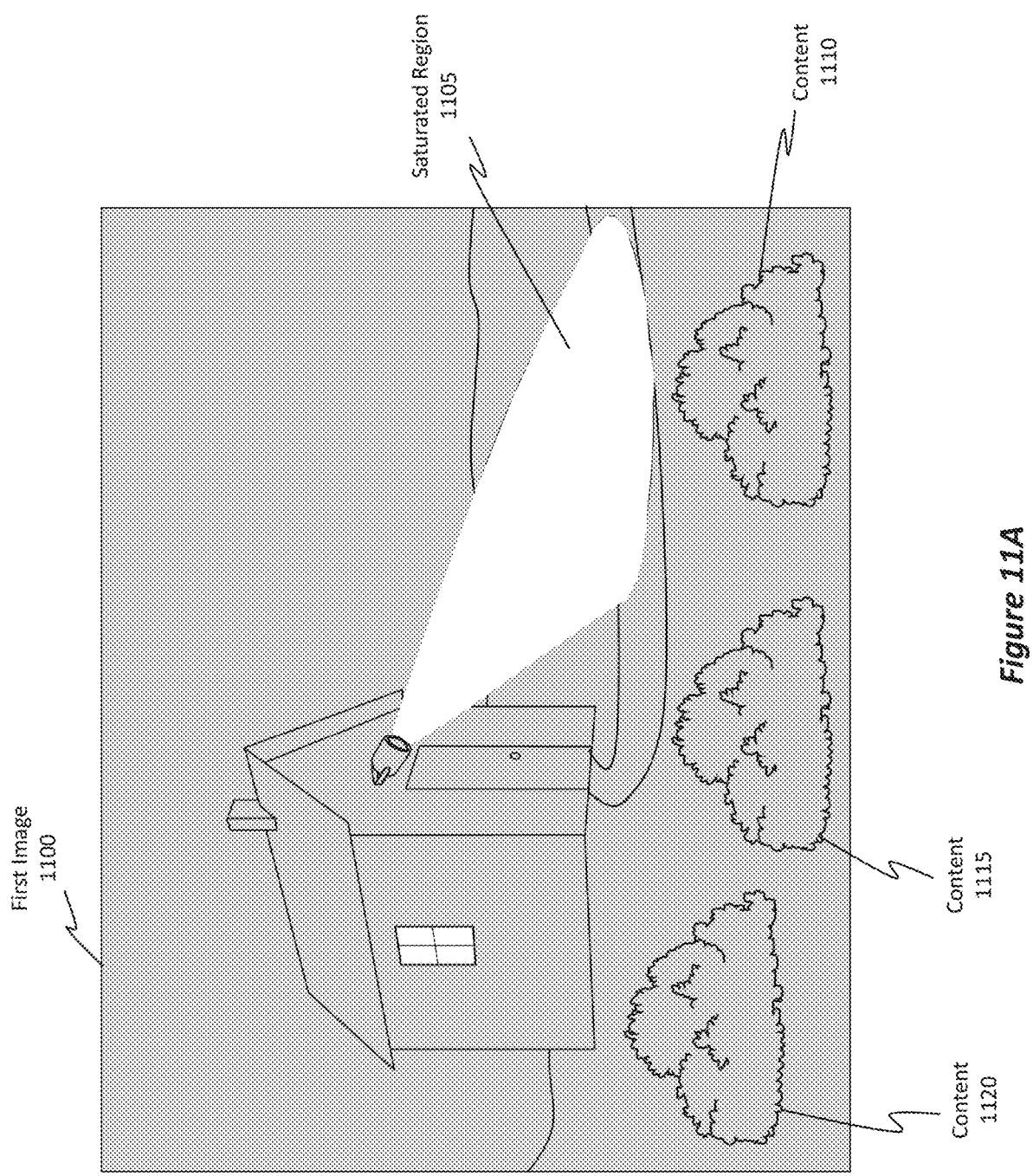

FIG. 11A shows an example of a first image 1100, which is a low light image generated by a camera having a low light modality. The various lighting signatures (or infrared (IR) signatures) of the objects are represented by the different grey tones in the image. Notice, a spotlight is attached to the edge of the building and is illuminating an area of the walk where, as will be shown in FIG. 11B, a human is standing. The illuminated area has saturated the low light camera, resulting in the saturated region 1105 of the first image 1100.

Figure 11B:
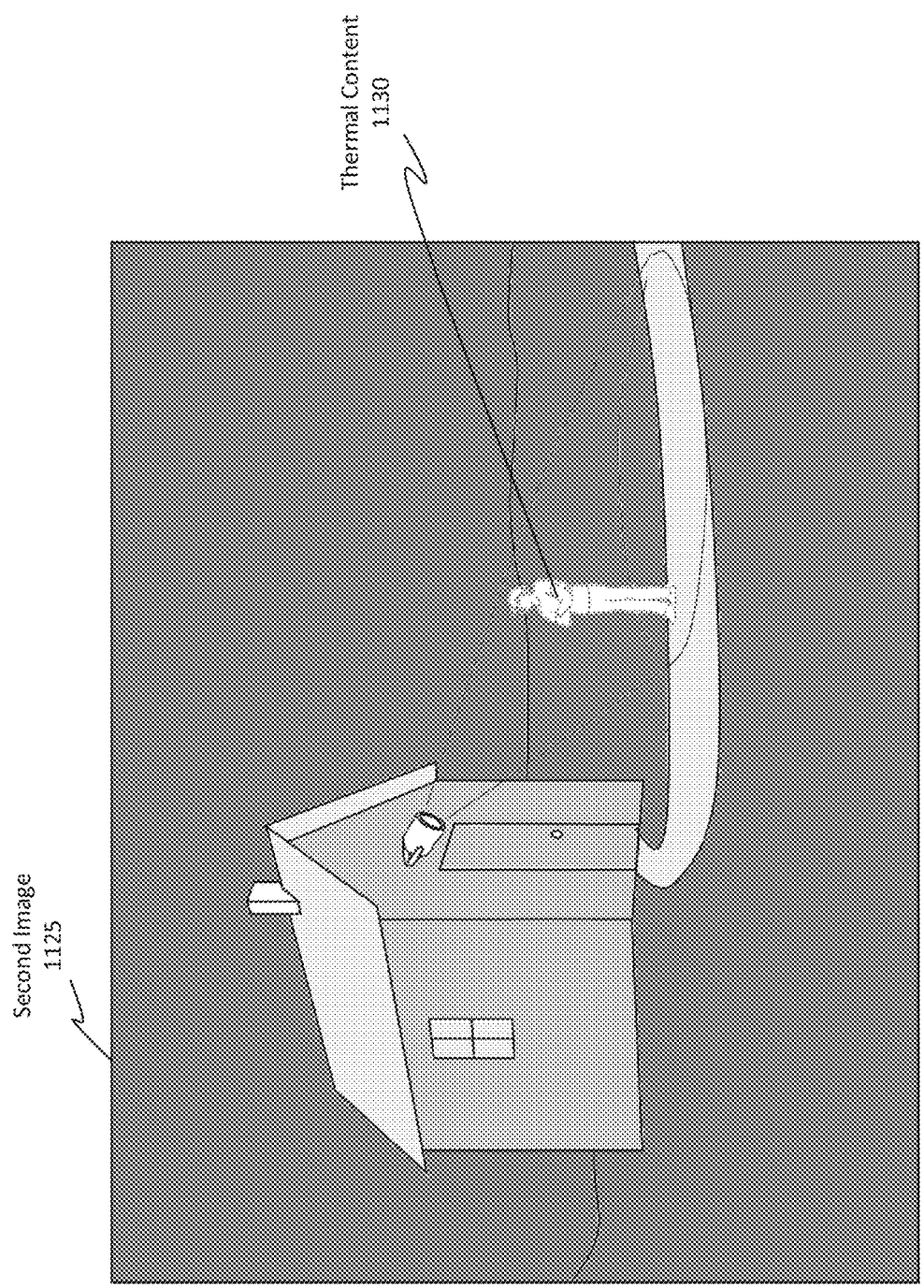

FIG. 11B, on the other hand, shows an example of a second image 1125, which is thermal image generated by a camera having a thermal modality. The various heat signatures of the objects are represented by the different grey tones in the image. For example, the second image 1125 shows a human standing on a walk, as shown by thermal content 1130. That is, the human that was previously not visible in the first image 1100 and that was standing in the illuminated area is now visible in the second image 1125.

Other features that were visible in the first image 1100 (e.g., content 1110, 1115, and 1120) are now not visible in the second image 1125 because those objects do not have a heat signature. To clarify, those bushes did not have a heat signature and thus were not visible in the thermal image (i.e. the second image 1125) but were visible in the low light image (i.e. the first image 1100).

Accordingly, the thermal image beneficially visualizes some content that may not be visible in a low light image, and the low light image beneficially visualizes some content that may not be visible in the thermal image. In accordance with the disclosed principles, it is desirable to generate an enhanced image that provides the benefits of both the low light image and the thermal image. Stated differently, it is desirable to generate an enhanced image that provides the benefits from different images that were generated from different cameras of different modalities.

Figure 11C:
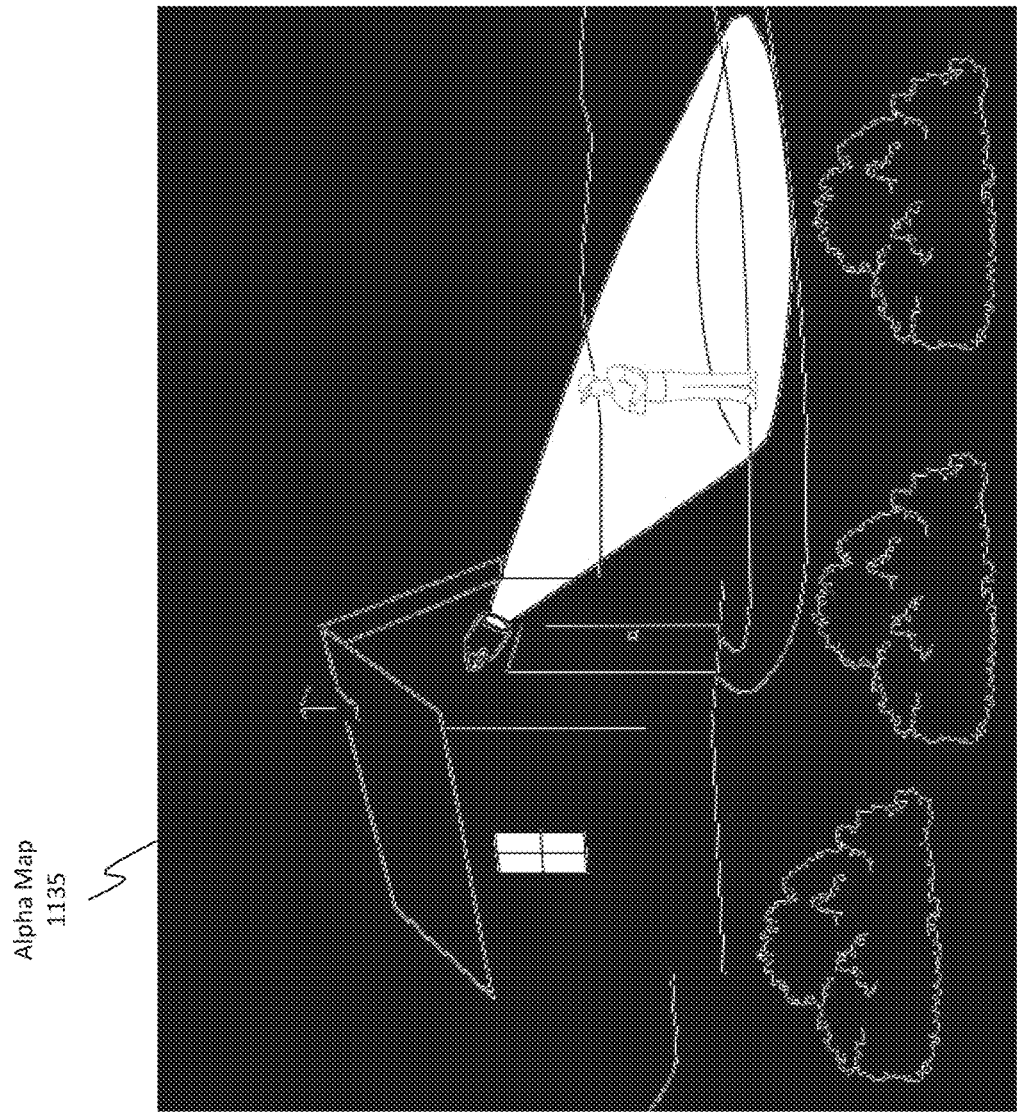

Following the flow chart 900 described in FIG. 9, the embodiments are able to generate an alpha map 1135, as shown in FIG. 11C. The alpha map 1135 indicates the source or contributor that provided texture for a particular pixel.

Specifically, the dark pixels in the alpha map 1135 reflect texture or pixel content that is sourced from one camera (e.g., the low light camera) while the white pixels reflect texture or pixel content that is sourced from a different camera (e.g., the thermal camera). To illustrate, supposing the dark pixels came from a low light camera and the white pixels came from a thermal camera, one can compare the alpha map 1135 against the first image 1100 of FIG. 11A and the second image 1125 of FIG. 11B. Notice, for areas where the low light camera was saturated, the alpha map 1135 shows white pixels; meaning that those pixels were sourced from the thermal camera. Similarly, for areas that are black in the alpha map 1135, those pixels were sourced from the low light camera. Some areas of the alpha map may include merged content; meaning that those pixels were sourced from a combination of both the low light camera and the thermal camera (or other camera modalities).

By following the flow chart 900 of FIG. 9, the embodiments are able to generate an enhanced image 1140, as shown in FIG. 11D. Notice, the enhanced image 1140 provides the benefits obtained from using a thermal image and, simultaneously, provides the benefits obtained from using a low light image. To illustrate, in the enhanced image 1140, the content 1145 (i.e. the human) is now visible using pixels obtained from the thermal image. Similarly, the content 1150, 1155, and 1160 (i.e. the bushes) are now visible using pixels obtained from the low light image. Such pixels are determined based on the embodiments' abilities to detect edges, as described earlier, using the texture values. If a set of edges are visible in one image (e.g., perhaps the thermal image) but those same set of edges are not visible in a different image (e.g., perhaps the low light image), it suggests that the thermal camera was able to pick up or detect content that was not visible by the low light camera, and vice versa.

By way of an additional explanation, the pixels in the alpha map corresponding to the illuminated area (i.e. the area where the spotlight is shining) likely reflected alpha intensities equal to or approximating the value 0, meaning that almost all of the texture used in the enhanced image 1140 for the illuminated area came from the thermal image. Similarly, the pixels in the alpha map corresponding to the bushes likely reflected alpha intensities equal to or approximating the value 1, meaning that almost all of the texture used in the enhanced image 1140 for the bush areas came from the low light image. The textures of the other areas of the enhanced image 1140 (e.g., the building) likely came from both the thermal image and the low light image, and the proportion of texture used depends on the alpha intensities in the alpha map.

In some cases, a color coding scheme may be used to reflect the origination of texture for a pixel. For instance, texture obtained from the first image can have a particular color hue associated with it while texture obtained from the second image can have a different color hue associated with it. When texture is obtained from both images, then the resulting hue can be the combination of the two hues, and the resulting hue is based on the proportion of texture provided by each image. Each pixel may also be tagged with metadata to reflect the source of the pixel's texture.

As another example, suppose the embodiments were being used in an indoor environment where walls were present. In one example case, suppose a set of hot water pipes were located within the wall. The low light camera would reflect the walls, but the thermal imaging camera would detect a heat signature. By generating the enhanced image, a user will be able to detect the presence of the hot water pipes even though those would not normally be visible via the naked eye.

Figure 12:
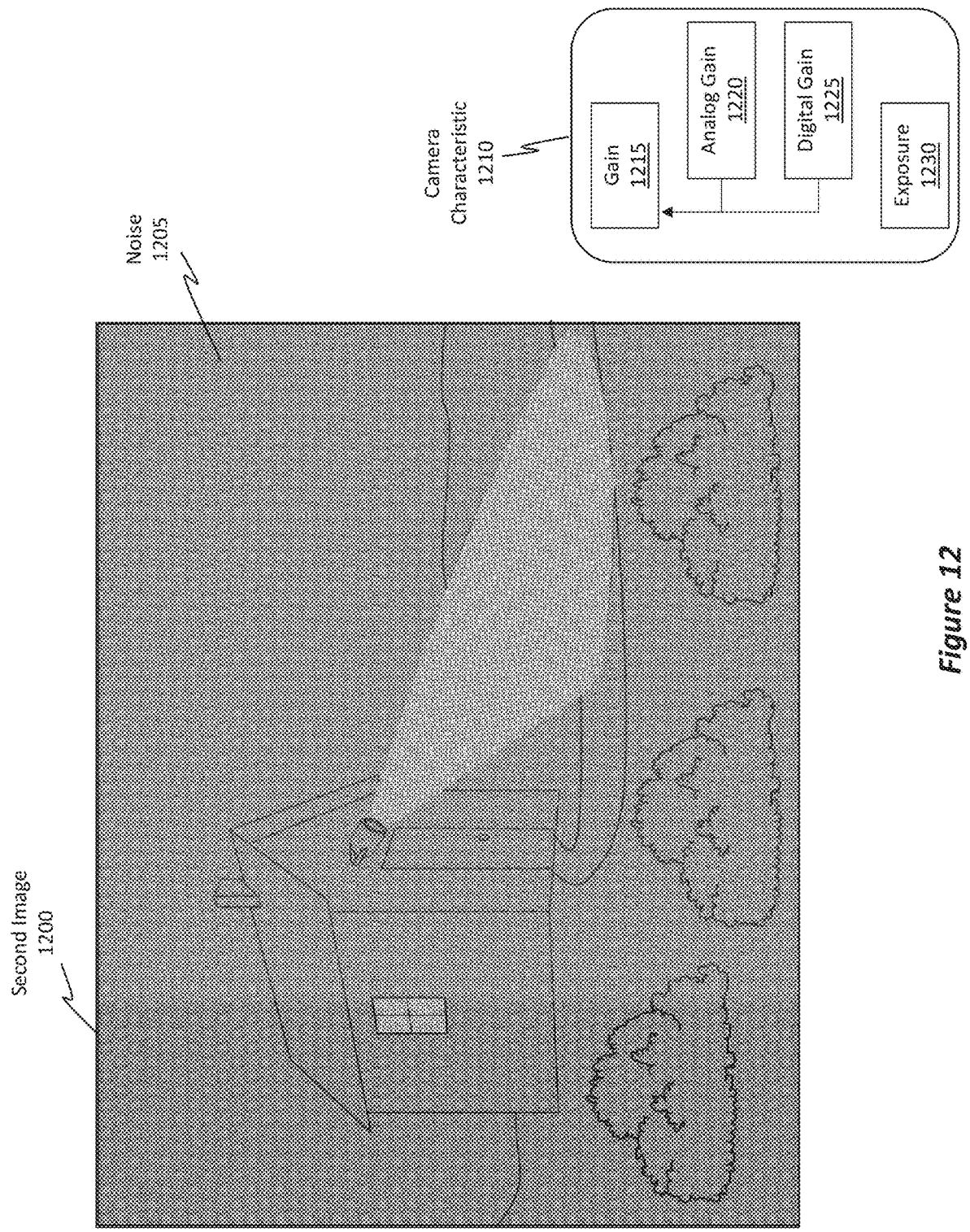
FIG. 12 illustrates an example of a noisy image.

In some scenarios, noise may be present in one of the images. For instance, in very low light conditions (e.g., 1.0 millilux or "starlight" environments), there might not be enough light photons in the environment for the low light camera to generate a high quality image. Indeed, the resulting image generated by the low light camera may be heavily corrupted with noise. FIG. 12 is illustrative.

When used in a very low light environment (e.g., about 1.0 millilux or "starlight" environments), the low light camera sensors attempt to compensate for the low light condition by ramping up the camera's gain (e.g., digital gain, analog gain, or a combination of digital and analog gain). As a result of ramping up the camera sensor's gain, the resulting image is very noisy, as shown by the second image 1200 of FIG. 12. Specifically, one can observe the noise 1205 present in the second image 1200.

As described above, there is a camera characteristic 1210 associated with the camera. This camera characteristic 1210 includes a gain 1215 (e.g., an analog gain 1220 or a digital gain 1225). Additionally, this camera characteristic 1210 can include an exposure 1230 time of the camera. In low light conditions, the gain 1215 and/or the exposure 1230 can be increased in an effort to detect more photons. Unfortunately, when this occurs in very low light conditions, the result of modifying the camera characteristic 1210 results in a high level of noise 1205.

Figure 13:
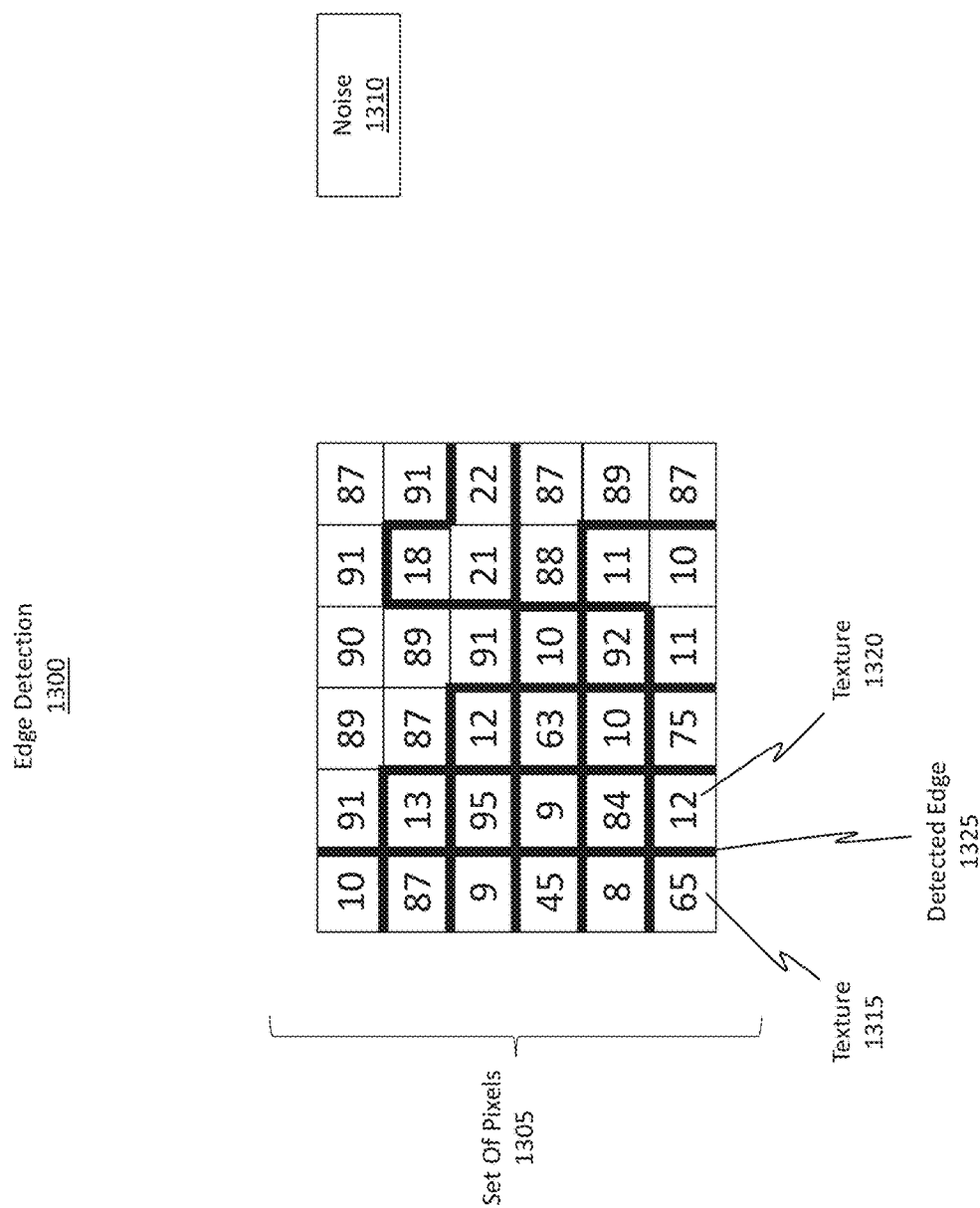
FIG. 13 illustrates the effects of performing edge detection on a noisy image.

FIG. 13 shows what would occur if the edge detection process described in FIG. 5 were implemented using the second image 1200 of FIG. 12. Specifically, FIG. 13 shows an edge detection 1300 process that is being performed on a set of pixels 1305. The set of pixels 1305 are pixels included in the second image 1200 of FIG. 12.

Notice, the texture values of the various pixels vary or change dramatically. These changes are due to the noise 1205 in the image, as shown by noise 1310. To illustrate, the texture 1315 has a value of "65" while the adjacent texture 1320 has a value of "12." By executing the edge detection algorithm mentioned earlier, the algorithm would identify a detected edge 1325.

Similarly, the algorithm would detect numerous other edges between the pixels in the set of pixels 1305, as shown by the bolded black lines separating some of the various pixels. As a result of the noise 1310, the algorithm would detect a very high number of edges in the image. The high number of edges would lead to a high saliency value for that image. With that high saliency value, the highly noisy image would then be weighted or considered more heavily than the other image (e.g., the thermal image). Consequently, when the alpha map is generated, the noisy image will be weighted more, and the resulting fused image will also be highly noisy and of low quality. What is needed, therefore, is a technique to mitigate the effects of noise that may be present in one image.

Figure 14:
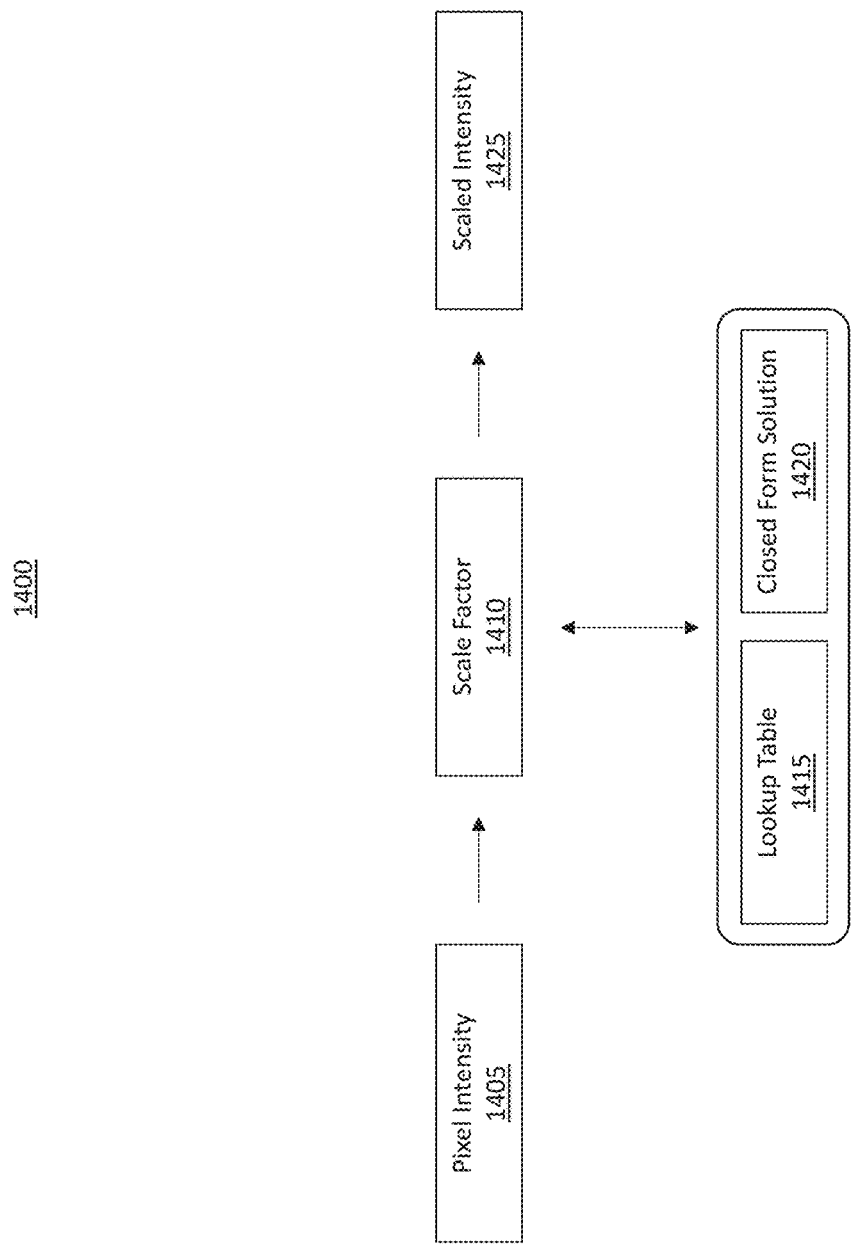
FIG. 14 illustrates an example process in which a scaling factor is applied to the texture values or intensity values of an image in order to mitigate the effects of noise in the image.

In accordance with the disclosed principles, the embodiments introduce a new "scaling factor" that is applied to the texture values of an image in order to mitigate the effects of noise in that image. Notably, the "scaling" or "scale" factor is different than a gain setting of the first camera. FIG. 14 is illustrative.

FIG. 14 shows an example process 1400 where a pixel intensity 1405 (aka a pixel texture) is scaled via use of a scale factor 1410 in order to mitigate the effects of noise. For instance, the pixel intensity 1405 can be the value "65" for the texture 1315 in FIG. 13. That value is scaled using the scale factor 1410 (aka scaling factor) to generate a scaled intensity value or a scaled texture value for that particular pixel. All pixels, or perhaps a selected number of pixels in the image, can be scaled using the scale factor 1410. Typically, the same scale factor 1410 is used for all of the pixels that are being scaled, though in some cases, a different scale factor can be used for different pixels in the set.

The scale factor 1410 can be acquired from a lookup table 1415 or using a closed form solution 1420 (e.g., a model). Furthermore, the scale factor 1410 is at least partially dependent on the camera characteristic 1210 mentioned in FIG. 12 (e.g., the gain 1215 and/or the exposure 1230).

Using the lookup table 1415 as an example, a mapping lookup table can be provided that maps values of the camera characteristic with corresponding values of the scale factor. As an example, say the camera's gain is a value from 1 to 32. The lookup table can map one or a combination of more than one gain values to corresponding scale factors. Notably, it is often the case that the gain and scale factors are inversely proportional in that the scale factor effectively undoes the increase in gain. One will appreciate how any mapping can be used, where the mapping can be based on a calibration event that is performed to determine the mapping values. The calibration event can be at least partially dependent on the amount of ambient light in the environment.

In effect, applying the scale factor 1410 to the pixel intensity 1405 operates to normalize the pixel intensity 1405. Often, gain settings are between 1 and 32. Often, the scale or scaling factor is between 0 and 20. Thus, it is often the case that the scaling factor is a different value than a value of a gain setting of the first camera.

Figure 15:
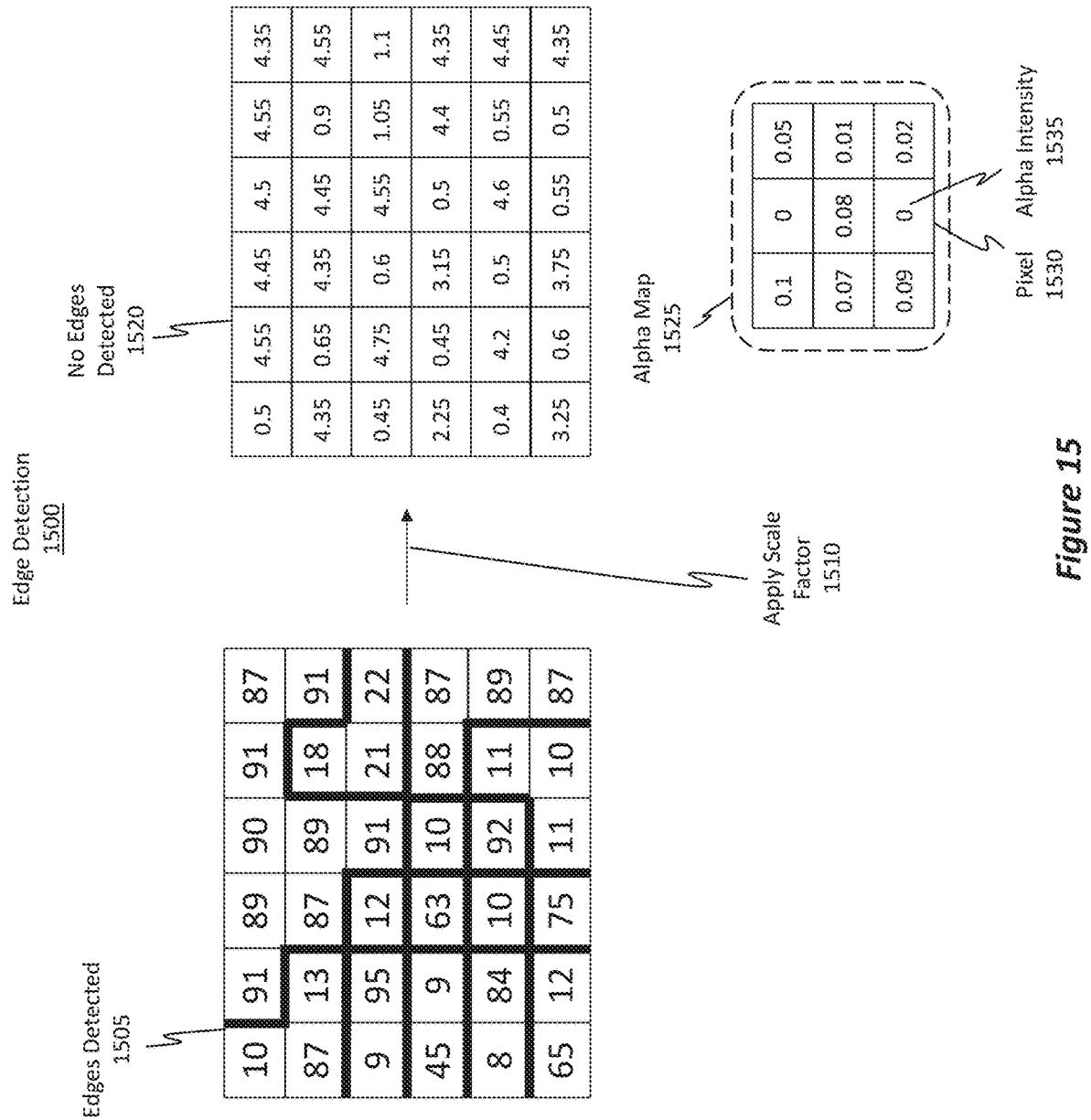
FIG. 15 shows the result of performing edge detection on a set of scaled texture values.

Instead of a lookup table 1415, the embodiments can also rely on a closed form solution 1420 (aka a closed form expression) to determine which scale factor 1410 to apply to the pixel intensities or textures. Generally, a closed form expression is a mathematical expression that uses a finite number of operations to achieve a solution. More generally, any type of model can be used as a closed form solution in order to determine which scale factor 1410 to use, where the scale factor 1410 is dependent on the camera characteristic 1210 of FIG. 12. As a result of applying the scale factor 1410 to the pixel intensity 1405, a resulting scaled intensity 1425 is produced. FIG. 15 provides some additional detail.

FIG. 15 shows an edge detection 1500 process that is similar to that edge detection processes mentioned previously. Before, in the scenario where a scale factor was not used, the scenario presented in the left of FIG. 15 was produced, resulting in a high number of edges being detected (e.g., edges detected 1505 as shown by the bolded black lines) because of the high level of noise. By applying the scale factor (e.g., as shown by apply scale factor 1510), the pixel intensities or textures in the image are scaled or "normalized," thereby mitigating the effects of having a high gain setting or high exposure period.

To illustrate, in this example scenario, a scale factor of "20" was selected based on the camera's characteristic (e.g., gain or exposure). Here, each of the pixel intensities were divided by the scale factor to generate scaled intensities. For example, starting from the top left corner of the left set of pixels, the intensity "10" was divided by "20" to generate a scaled value of "0.5." Similarly, the intensity "91" was divided by "20" to generate a scaled value of "4.55," and so on and so forth.

Now, the disparity between the pixel intensities may not be sufficient (or may not exceed a threshold) for the edge detection algorithm to determine an edge exists between those different pixels. For instance, in this example scenario, no edges were detected, as shown by no edges detected 1520.

As a result of fewer edges being detected in the one image (e.g., the low light image), the resulting saliency for that image will also be lower. Because of a lower saliency, the resulting alpha map will weight that image lower than the other image (e.g., the thermal image), as shown by the alpha map 1525. Notice, the alpha intensities for the various pixels (e.g., pixel 1530 has an alpha intensity 1535) are closer to a value of "0" than to a value of "1." Values closer to "0" in the alpha map 1525 indicate that the alpha map is weighting the second image (e.g., the thermal image) more than the first image (e.g., the low light image). Stated differently, when generating the fused enhanced image, more texture content will be pulled from the thermal image than from the low light image. This is beneficial because the low light image is highly noisy.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 16A:
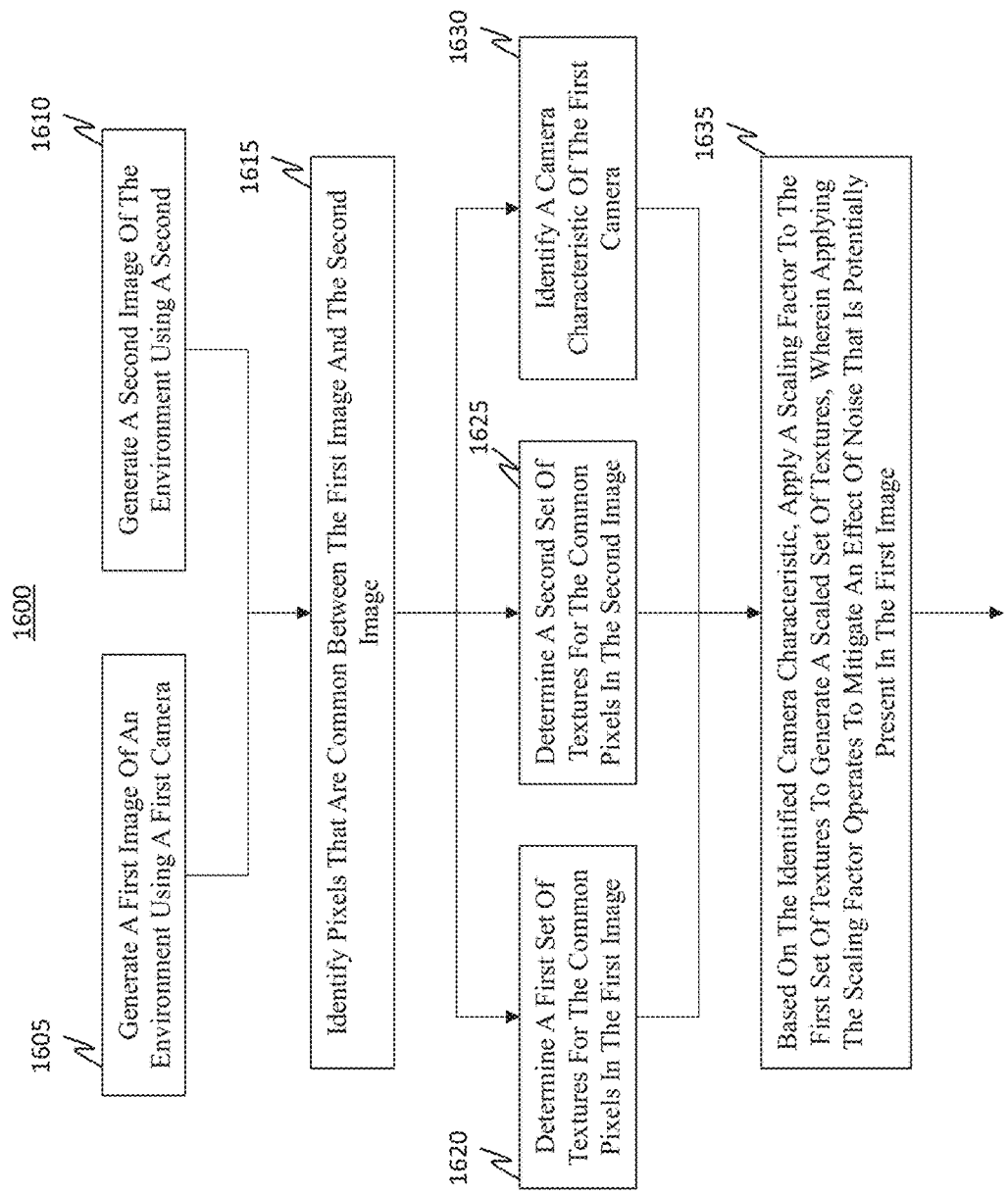
FIGS. 16A and 16B illustrate a flow chart of an example method for mitigating the effects of noise when fusing multiple images together to generate a fused enhanced image.
Figure 16B:
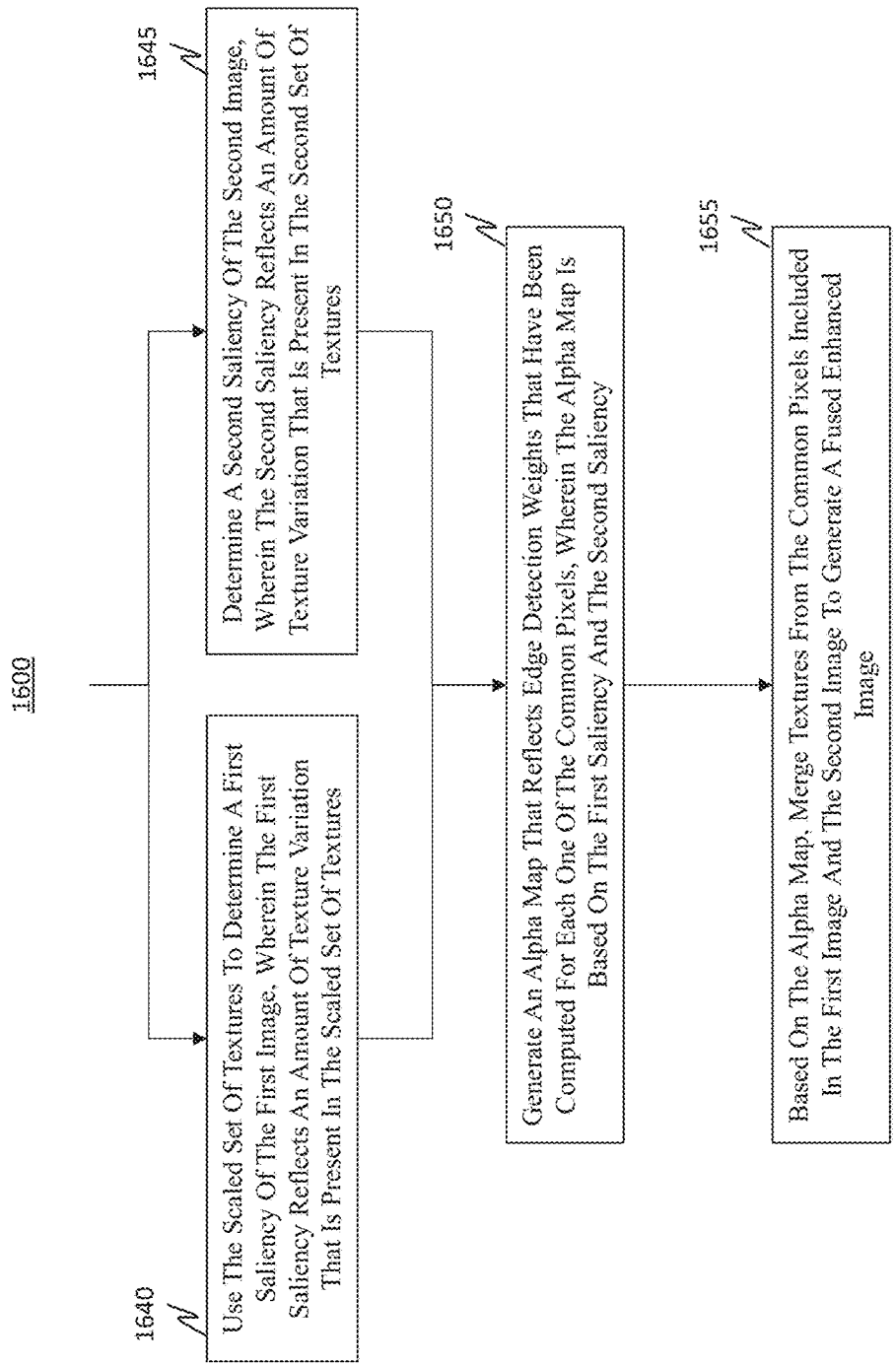

Attention will now be directed to FIGS. 16A and 16B, which illustrate a flowchart of an example method 1600 for generating a fused enhanced image. In some cases, the method 1600 may be implemented by a computer system or by a HMD that includes a first camera of a first modality (e.g., a low light modality) and a second camera of a second modality (e.g., a thermal modality). In some cases, one of the first modality or the second modality is a short wave infrared (SWIR) modality or, alternatively, a near infrared (NIR) modality.

Optionally, the first modality is selected from a group of modalities comprising: a visible light modality, a monochrome modality, a near infrared (NIR) modality, a short wave infrared (SWIR) modality, a thermal modality, or an ultraviolet (UV) modality. As another option, the second modality is also selected from the group of modalities and is different than the first modality.

Method 1600 involves an act (act 1605) of generating a first image (e.g., first image 1100 of FIG. 11A) of an environment using the first camera of the first modality (e.g., low light modality). There is also an act (act 1610) of generating a second image (e.g., second image 1125 of FIG. 11B) of the environment using the second camera of the second modality (e.g., thermal imaging modality). These two acts may be performed in parallel with one another or in serial with one another. For example, in the case where the acts are performed in serial, act 1605 may occur first and then act 1610 or, alternatively, act 1610 may occur first and then act 1605. Notably, the two images at least partially reflect the same content or the same area of the environment.

In some implementations, parallax correction is performed on one or more of the first image or the second image. The parallax correction is performed to align the perspectives embodied within the two images, as discussed earlier. The parallax correction can involve performing a planar reprojection or, alternatively, a full reprojection. In some cases, correcting for parallax results in the perspective of the two images being aligned with the person's pupils or, alternatively, with another desired perspective that is different from the person's pupil perspective.

For example, it may be the case that the second image is parallax corrected to conform with the perspective embodied by the first image. Alternatively, it may be the case that the first image is parallax corrected to conform with perspective embodied by the second image. Indeed, various different perspectives may be achieved by performing parallax correction. Accordingly, a planar reprojection operation or a full reprojection operation may be performed to account for parallax.

Act 1615 involves identifying pixels that are common between the first image and the second image. For example, the set of common pixels 430 from FIG. 4 can be identified. Such an operation is beneficial so that processing is performed on relevant content, or rather, on content that is supposedly the same between the two images. Furthermore, such an operation is performed in order to offset or account for scenarios such as the one described earlier, where one image may not include adequate texture but where the other image's texture can compensate for such a deficiency. As discussed earlier, it may be the case that even though the pixels are supposed to represent the same content, the resulting textures between the two images may be different.

Act 1620 involves determining a first set of textures for the common pixels included in the first image. In parallel or in serial with act 1620, act 1625 involves determining a second set of textures for the common pixels included in the second image. For example, the textures 435 from FIG. 4 can be determined for both images.

Act 1630 involves identifying a camera characteristic of the first camera, where the camera characteristic is associated or linked with noise that may be present in the first image. For instance, the camera characteristic mentioned in act 1630 may be the camera characteristic 1210 of FIG. 12, which includes a gain 1215 (e.g., analog and/or digital) or an exposure 1230. Both of these characteristics are linked or associated with the amount of noise that will be present in the first image. For instance, a higher gain setting or a prolonged exposure will both indicate that more noise will be present in the resulting image. Stated differently, in some cases, the camera characteristic is a gain setting of the first camera. A relatively higher value for the gain setting (and exposure setting too) indicates a relatively higher amount of noise will likely be in the first image. Relatedly, a relatively lower value for the gain setting (and exposure setting) indicates a relatively lower amount of noise will likely be in the first image.

Based on the identified camera characteristic (e.g., gain or exposure), there is an act (act 1635) of applying a scaling factor to the first set of textures to generate a scaled set of textures. The process of applying the scaling factor operates to mitigate an effect of noise that is potentially present in the first image. In some implementations, a scaling factor (e.g., either the same scaling factor or a different scaling factor) is applied to the second set of textures for the common pixels in the second image. Consequently, the second image is also normalized, similar to the first image. Scaling the second image is beneficial in situations such as when one camera is a visible light camera and the other camera is an IR camera.

In some cases, the scaling factor is obtained from a lookup table comprising values that were generated based on a calibration event. In some cases, the scaling (or scale) factor is obtained from a model, such as a closed form solution/expression. In some embodiments the process of applying the scaling factor includes dividing (e.g., for each texture in the first set of textures) each texture by the scaling factor to generate a scaled texture value. Of course, if a different type of scaling factor were used (e.g., perhaps a decimal value), then applying the scaling factor can be performed via multiplication instead of division. Often, the scaling factor is relatively lower when the environment has a relatively higher amount of ambient light, and the scaling factor is relatively higher when the environment has a relatively lower amount of ambient light.

In some cases, applying the scaling factor is performed in a response to a determination that an ambient light level of the environment is below a light threshold. For instance, use of the scaling factor can be triggered based on the ambient light levels. If the ambient light levels are above a threshold level, then no scaling might occur. The scaling might occur after the ambient light levels drop below a certain level. Alternatively, the scaling factor might always be performed, regardless of the ambient light level. For instance, it may be the case that the scaling factor can be set to a value of "1" for certain gain or exposure settings. Division by "1" results in the original number; therefore, applying the scaling factor has no effect on the resulting image or alpha map.

Method 1600 continues in FIG. 16B. Specifically, method 1600 includes an act (act 1640) of using the scaled set of textures to determine a first saliency of the first image. Notably, the first saliency reflects an amount of texture variation that is present in the scaled set of textures.

In parallel or in serial with act 1640, act 1645 includes determining a second saliency of the second image. The second saliency reflects an amount of texture variation in the second image. For example, the saliency 525 from FIG. 5 may be determined for both images or at least for the pixels that are common between the two images. Optionally, the first saliency and the second saliency are computed using one or more of: a Sobel filter, a Laplacian filter, a neural network, or a computation based on intensity variation in a group of pixels.

Method 1600 includes an act (act 1650) of generating an alpha map that reflects edge detection weights, or "alpha intensities," that have been computed for each one of the common pixels based on the first saliency and the second saliency. For example, the alpha map 1525 from FIG. 15 can be computed based on the saliencies in order to reflect the edge detection weights (e.g., alpha intensity 1535). As discussed earlier, the alpha map is computed based on the second saliency divided by the sum of the first saliency and the second saliency. Therefore, as a result of the scaled set of textures being scaled and as a result of the alpha map being generated based on the first saliency (which is based on the scaled set of textures), the alpha map weights the second saliency more heavily than the first saliency.

Based on the alpha map, there is then an act (act 1655) of merging textures from the common pixels included in the first image and the second image to generate a fused enhanced image. That is, the alpha map is used to determine how much texture from the first image and/or from the second image to use to generate the fused enhanced image.

This determining process is based on the edge detection weights included within the alpha map. With reference to FIGS. 11A and 11B, the texture for the content 1110 is visible in the first image 1100 but is not visible in the second image 1125. Consequently, the embodiments will select the texture for the content 1110 from the first image 1100. Similarly, the texture for the thermal content 1130 is visible in the second image 1125 but is not visible in the first image 1100. Consequently, the embodiments will select the texture for the thermal content 1130 from the second image 1125. The alpha map is used to make these determinations because the alpha map indicates or reflects the presence or absence of edges in a pixel via the edge detection weights.

In some cases, the fused enhanced image is then displayed on a display of the HMD or computer system as a pass-through image. A user can then view the passthrough image via the display.

In some cases, the fused enhanced image is further analyzed so that object recognition or object segmentation is performed on the enhanced image. For example, in the scenario where the embodiments are used in a self-driving car, the car may have at least two different cameras of different modalities. The car's system can operate in the manner described above. When the fused enhanced image is finally generated, the car's system can then analyze the image to identify objects, such as to perform obstacle avoidance or to ensure the car is traveling in a desired path. Therefore, in some situations, the fused enhanced image may (or may not) be displayed and may (or may not) be further analyzed in an effort to identify objects for obstacle avoidance.

Example Computer/Computer Systems

Figure 17:
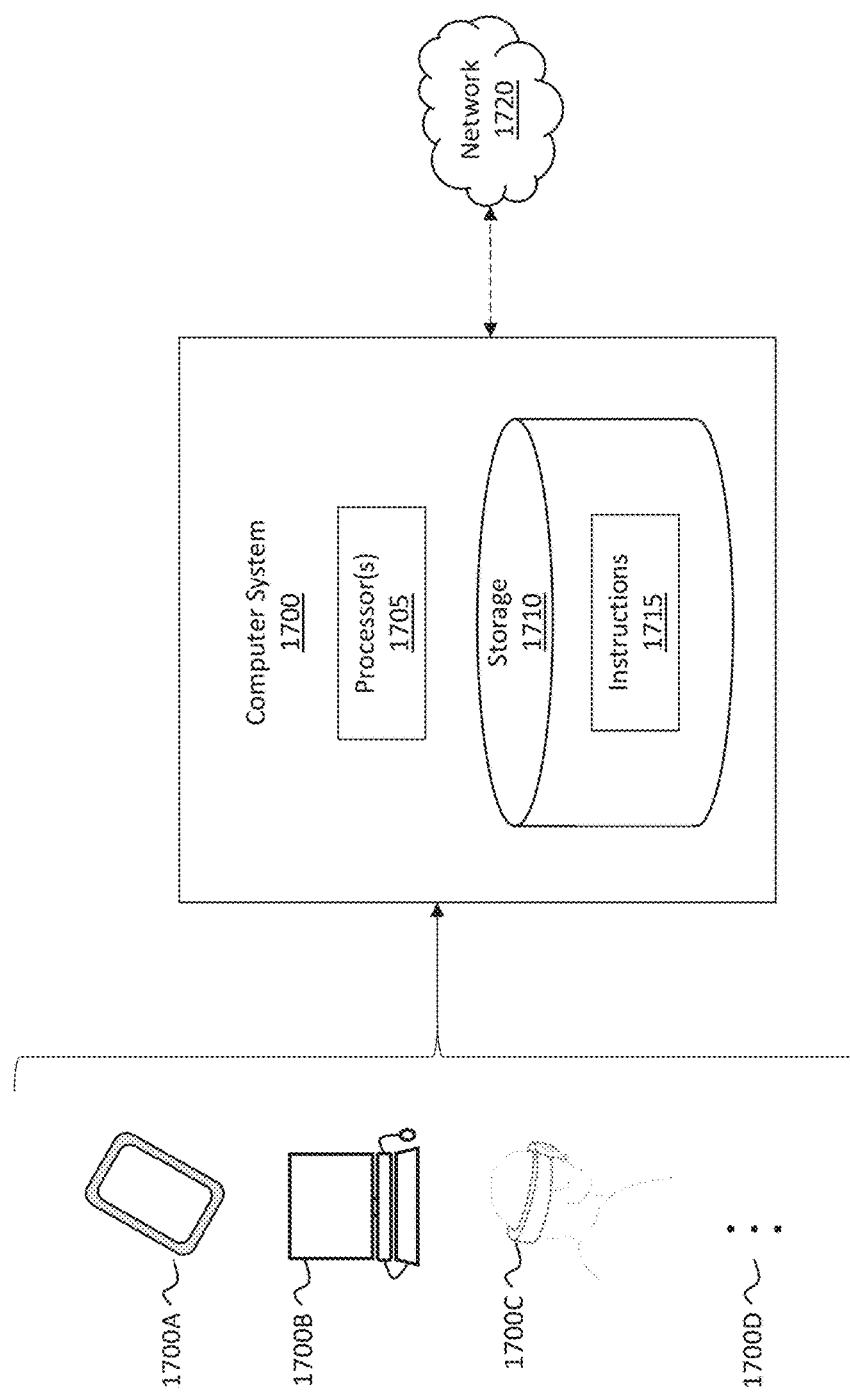
FIG. 17 illustrates an example computer system configured to perform any of the disclosed operations.

Attention will now be directed to FIG. 17 which illustrates an example computer system 1700 that may include and/or be used to perform any of the operations described herein. Computer system 1700 may take various different forms. For example, computer system 1700 may be embodied as a tablet 1700A, a desktop or a laptop 1700B, a wearable device (e.g., HMD 1700C), a mobile device, a standalone device, or any other device as illustrated by the ellipsis 1700D. Computer system 1700 may also be a distributed system that includes one or more connected computing components/devices that are in communication with computer system 1700.

In its most basic configuration, computer system 1700 includes various different components. FIG. 17 shows that computer system 1700 includes one or more processor(s) 1705 (aka a "hardware processing unit") and storage 1710.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("AS SP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1700. The different components, modules, engines, and services described herein may be implemented as objects or processors that execute on computer system 1700 (e.g. as separate threads).

Storage 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1710 is shown as including executable instructions 1715. The executable instructions 1715 represent instructions that are executable by the processor(s) 1705 of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks 1720 to remote/separate computer systems(s) that are configured to perform any of the processing described with regard to computer system 1700.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that mitigates effects of noise when fusing multiple images together to generate an enhanced image, said computer system comprising:
   a first camera of a first modality;
   a second camera of a second modality;
   one or more processors; and
   one or more computer-readable hardware storage devices that store instructions that are executable by the one or more processors to cause the computer system to:
      trigger generation of a first image of an environment using the first camera;
      trigger generation of a second image of the environment using the second camera;
      identify pixels that are common between the first image and the second image;
      determine a first set of textures for the common pixels in the first image;
      determine a second set of textures for the common pixels in the second image;
      identify a gain setting of the first camera;
      based on the identified gain setting, apply a scaling factor to the first set of textures to generate a scaled set of textures, wherein applying the scaling factor operates to mitigate an effect of noise that is potentially present in the first image;

use the scaled set of textures to determine a first saliency of the first image, wherein the first saliency reflects an amount of texture variation that is present in the scaled set of textures;

determine a second saliency of the second image, wherein the second saliency reflects an amount of texture variation that is present in the second set of textures;

generate an alpha map that reflects edge detection weights that have been computed for each one of the common pixels, wherein the alpha map is based on the first saliency and the second saliency; and based on the alpha map, merge textures from the common pixels included in the first image and the second image to generate a fused enhanced image.

2. The computer system of claim 1, wherein the first camera is a low light camera having a low light modality, and the second camera is a thermal imaging camera having a thermal imaging modality.

3. The computer system of claim 1, wherein the scaling factor is relatively lower when the environment has a relatively higher amount of ambient light, and the scaling factor is relatively higher when the environment has a relatively lower amount of ambient light.

4. The computer system of claim 1, wherein the scaling factor is a number in a range from 0 to 20.

5. The computer system of claim 1, wherein the edge detection weights are computed by kernel convolution, and wherein a kernel of pixels used by the kernel convolution is comprised of a group of pixels, said group of pixels being one of: a 3×3 group of pixels, a 5×5 group of pixels, or a 7×7 group of pixels.

6. The computer system of claim 1, wherein a Sobel filter is used to determine the first and second saliencies.

7. The computer system of claim 1, wherein the alpha map is computed based on the second saliency divided by a sum of the first saliency and the second saliency.

8. The computer system of claim 1, wherein the first modality is selected from a group of modalities comprising: a visible light modality, a monochrome modality, a near infrared (NIR) modality, a short wave infrared (SWIR) modality, a thermal modality, or an ultraviolet (UV) modality, and
wherein the second modality is also selected from the group of modalities and is different than the first modality.

9. A computer system that mitigates effects of noise when fusing multiple images together to generate an enhanced image, said computer system comprising:
one or more processors; and
one or more computer-readable hardware storage devices that store instructions that are executable by the one or more processors to cause the computer system to:
identify pixels that are common between a first image and a second image;
determine a first set of textures for the common pixels in the first image;
determine a second set of textures for the common pixels in the second image;
identify a gain setting associated with at least one of the first image or the second image;
based on the identified gain setting, apply a scaling factor to the first set of textures to generate a scaled set of textures;
use the scaled set of textures to determine a first saliency of the first image, wherein the first saliency reflects an amount of texture variation that is present in the scaled set of textures;
determine a second saliency of the second image, wherein the second saliency reflects an amount of texture variation that is present in the second set of textures;
generate an alpha map that reflects edge detection weights that have been computed for each one of the common pixels, wherein the alpha map is based on the first saliency and the second saliency; and
based on the alpha map, merge textures from the common pixels included in the first image and the second image to generate a fused enhanced image.

10. The computer system of claim 9, wherein the fused enhanced image is displayed on a display of the computer system as a passthrough image.

11. The computer system of claim 9, wherein the scaling factor is relatively lower when the environment has a relatively higher amount of ambient light, and the scaling factor is relatively higher when the environment has a relatively lower amount of ambient light.

12. The computer system of claim 9, wherein the scaling factor is a number in a range from 0 to 20.

13. The computer system of claim 9, wherein the edge detection weights are computed by kernel convolution.

14. The computer system of claim 9, wherein the edge detection weights are computed by kernel convolution, and wherein a kernel of pixels used by the kernel convolution is comprised of a group of pixels, said group of pixels being one of: a 3×3 group of pixels, a 5×5 group of pixels, or a 7×7 group of pixels.

15. The computer system of claim 9, wherein a Sobel filter is used to determine the first and second saliencies.

16. The computer system of claim 9, wherein the alpha map is computed based on the second saliency divided by a sum of the first saliency and the second saliency.

17. A method for mitigating effects of noise when fusing multiple images together to generate an enhanced image, said method comprising:
identifying pixels that are common between a first image and a second image;
determining a first set of textures for the common pixels in the first image;
determining a second set of textures for the common pixels in the second image;
identifying a gain setting associated with at least one of the first image or the second image;
based on the identified gain setting, applying a scaling factor to the first set of textures to generate a scaled set of textures;
using the scaled set of textures to determine a first saliency of the first image, wherein the first saliency reflects an amount of texture variation that is present in the scaled set of textures;
determining a second saliency of the second image, wherein the second saliency reflects an amount of texture variation that is present in the second set of textures;
generating an alpha map that reflects edge detection weights that have been computed for each one of the common pixels, wherein the alpha map is based on the first saliency and the second saliency; and
based on the alpha map, merging textures from the common pixels included in the first image and the second image to generate a fused enhanced image.

18. The method of claim 17, wherein the edge detection weights are computed by kernel convolution, and wherein a kernel of pixels used by the kernel convolution is comprised of a group of pixels, said group of pixels being one of: a 3×3 group of pixels, a 5×5 group of pixels, or a 7×7 group of pixels.

19. The method of claim 17, wherein the scaling factor is relatively lower when the environment has a relatively higher amount of ambient light, and the scaling factor is relatively higher when the environment has a relatively lower amount of ambient light.

20. The method of claim 17, wherein the scaling factor is a number in a range from 0 to 20.

* * * * *